United States Patent Office 3,553,059
Patented Jan. 5, 1971

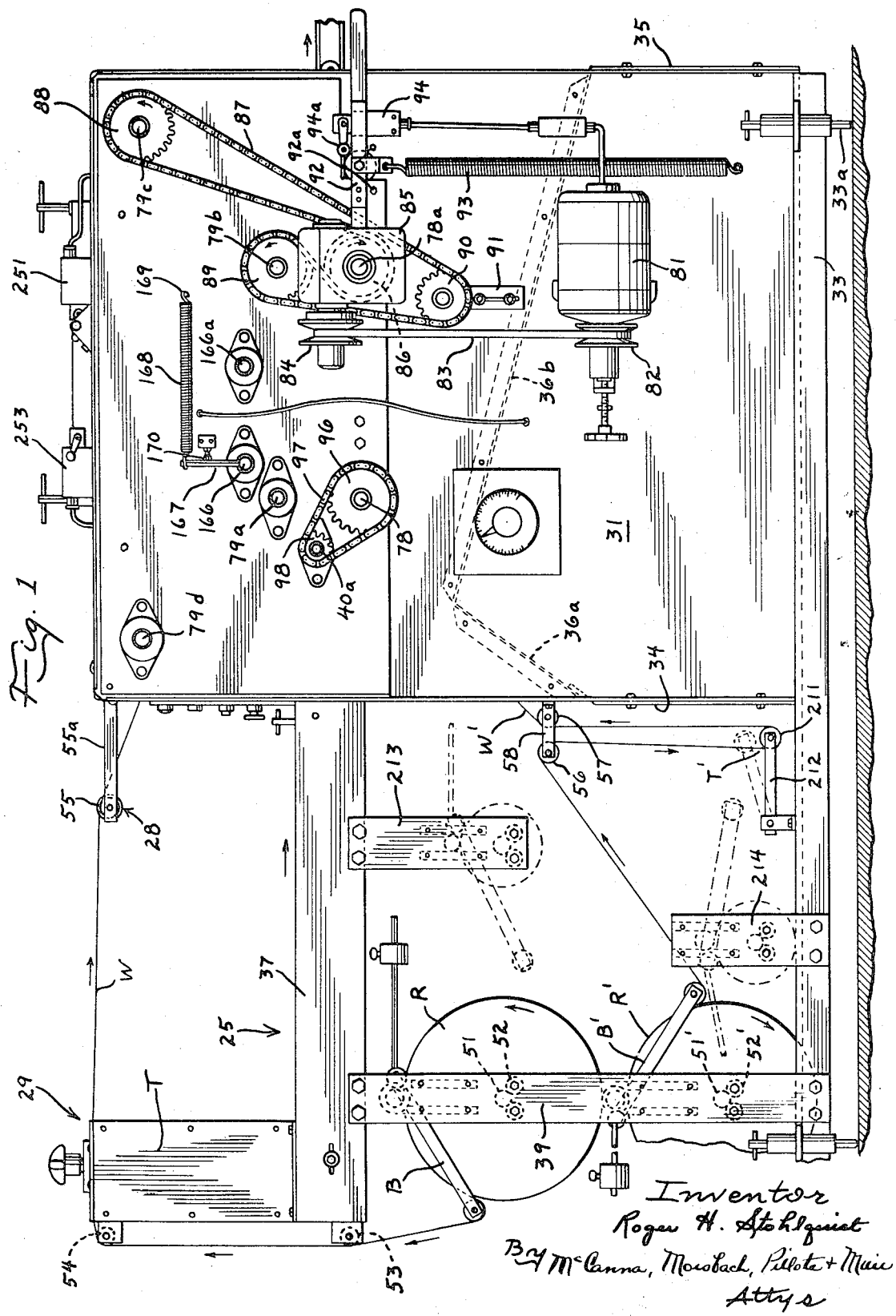

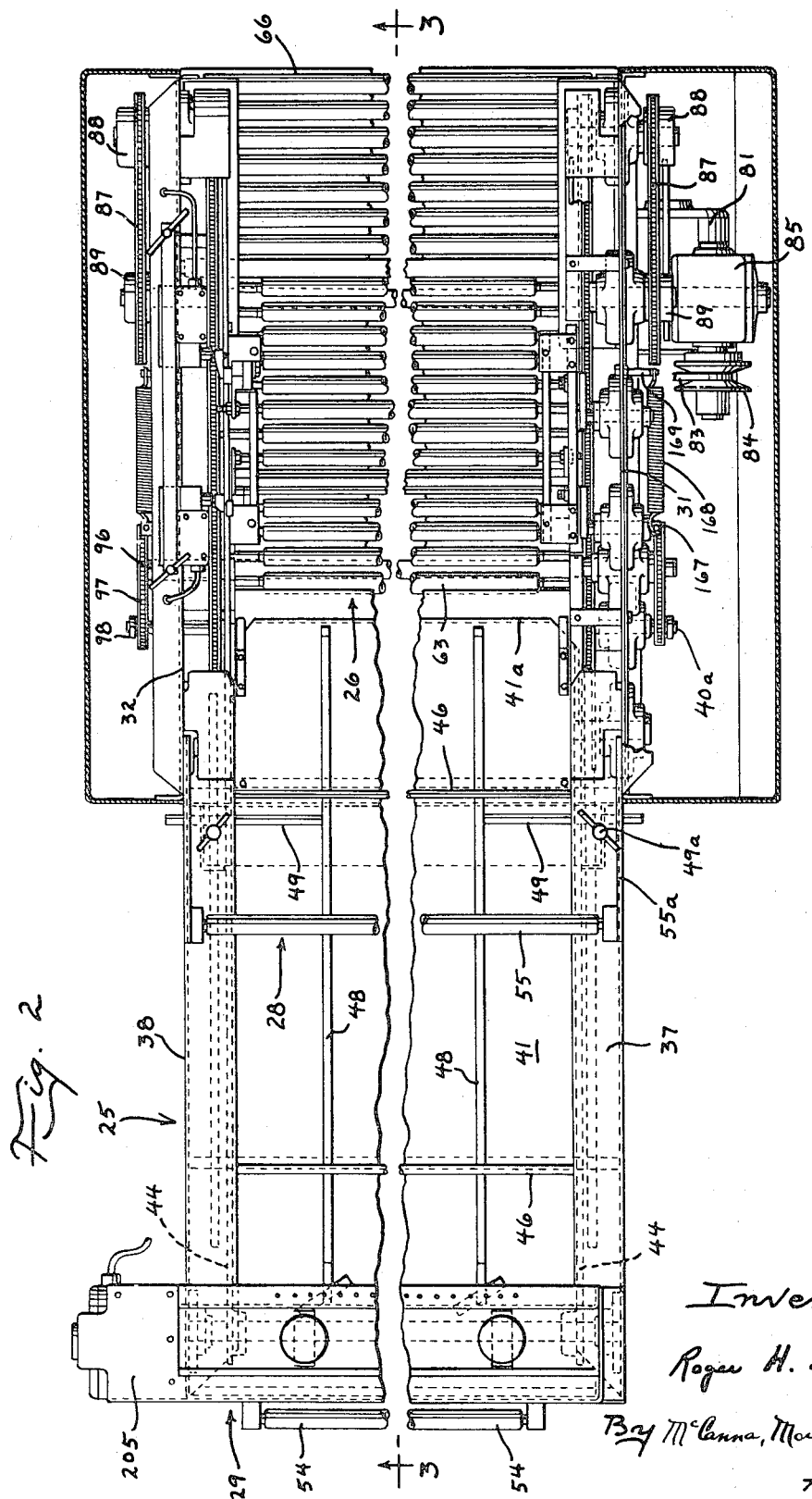

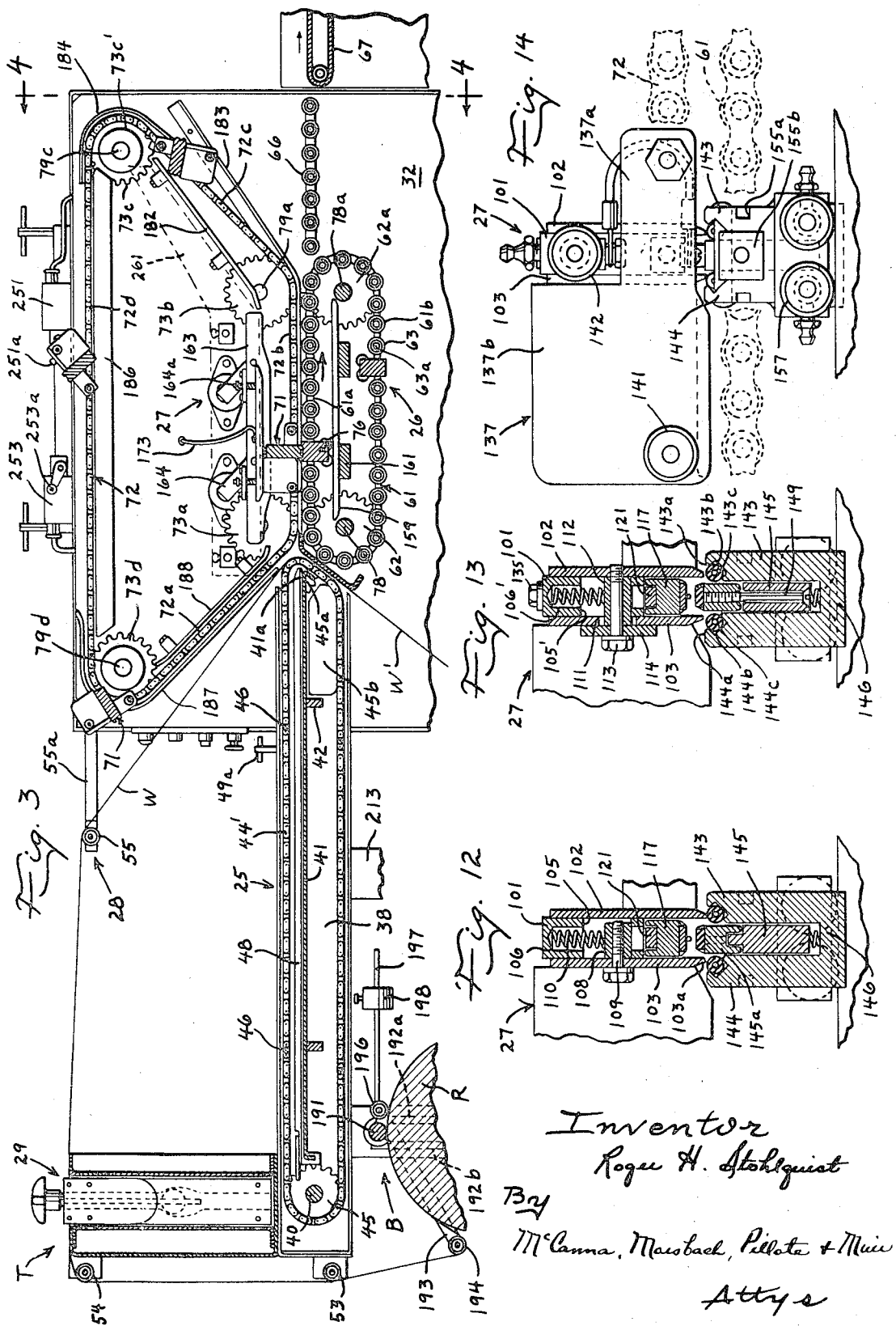

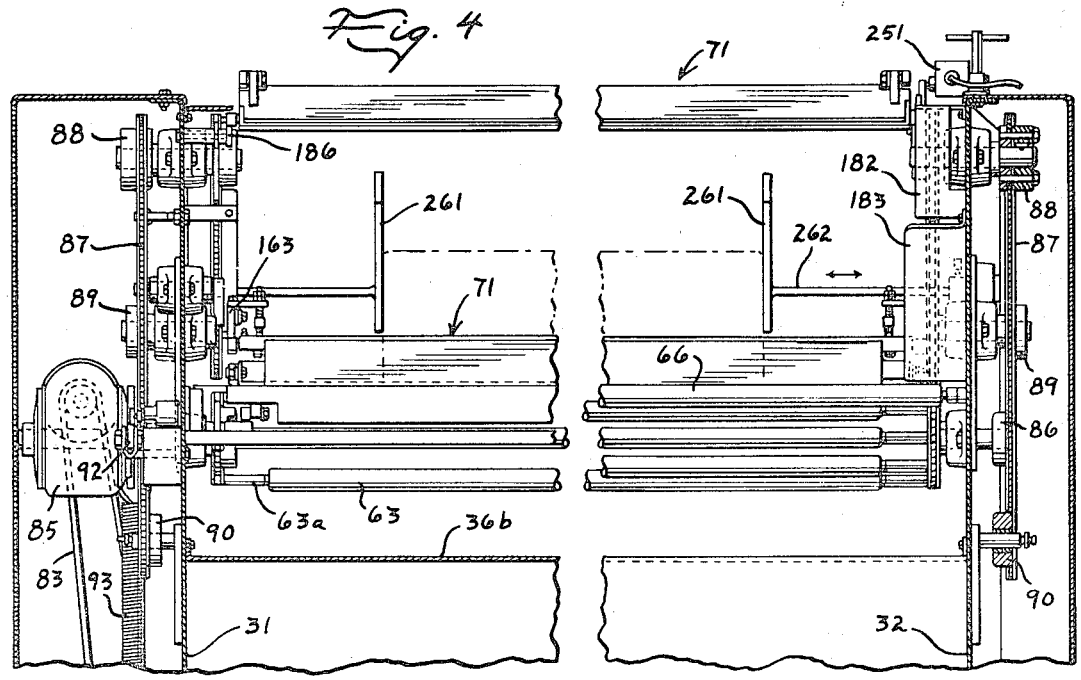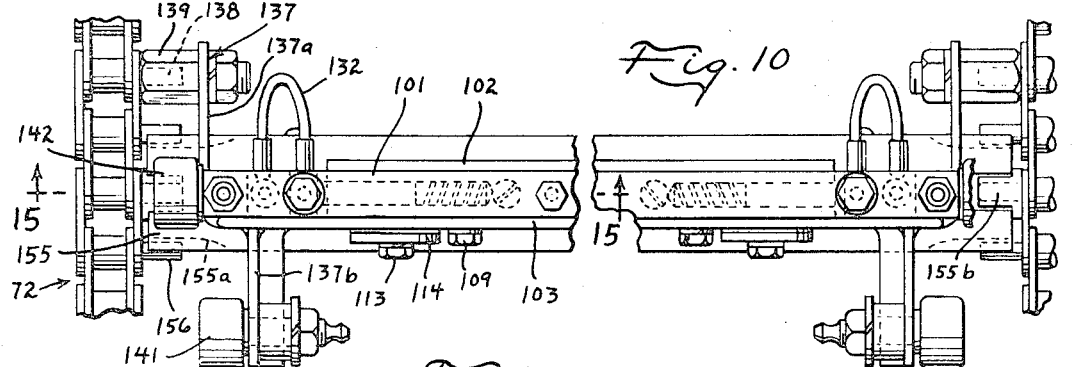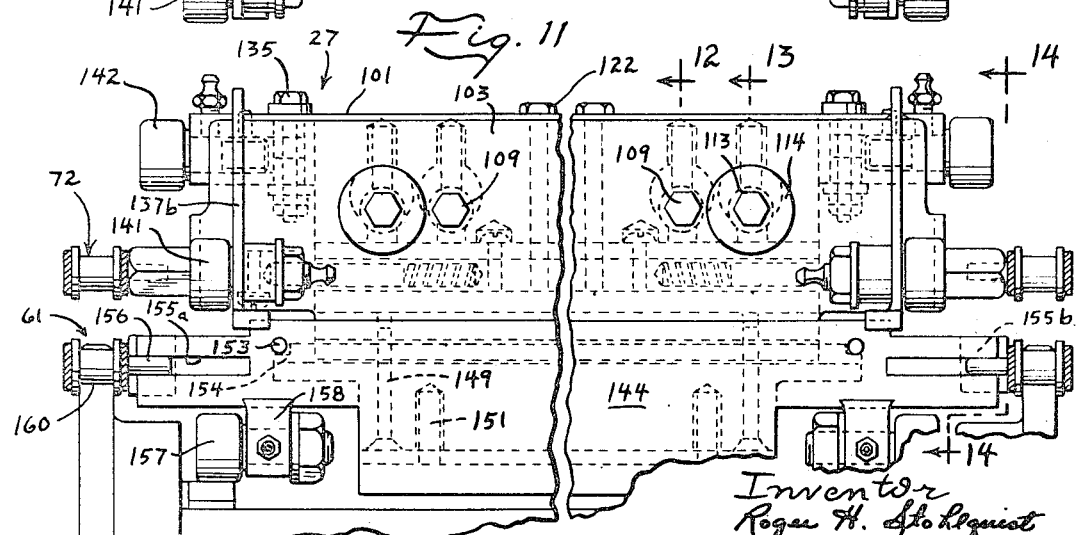

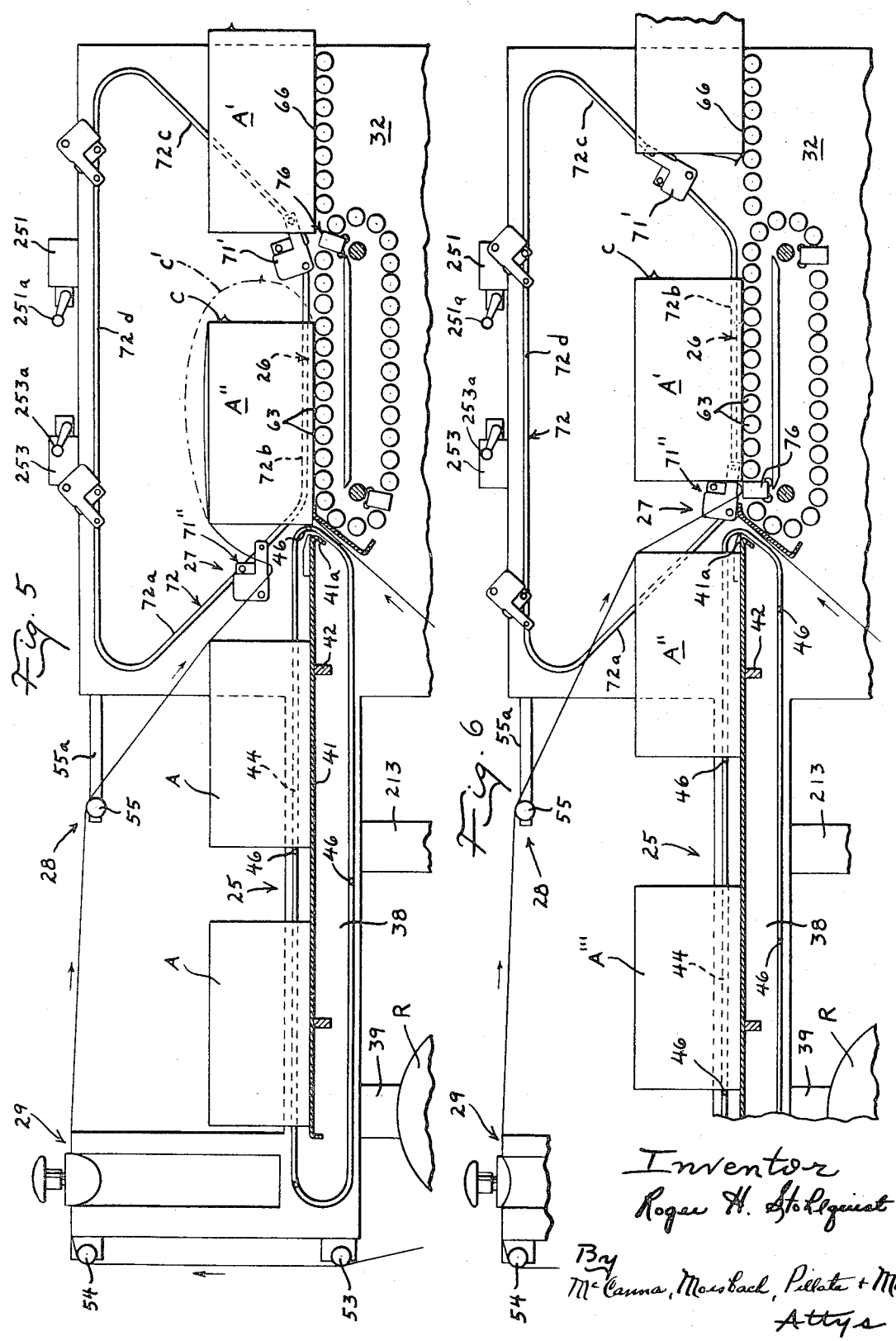

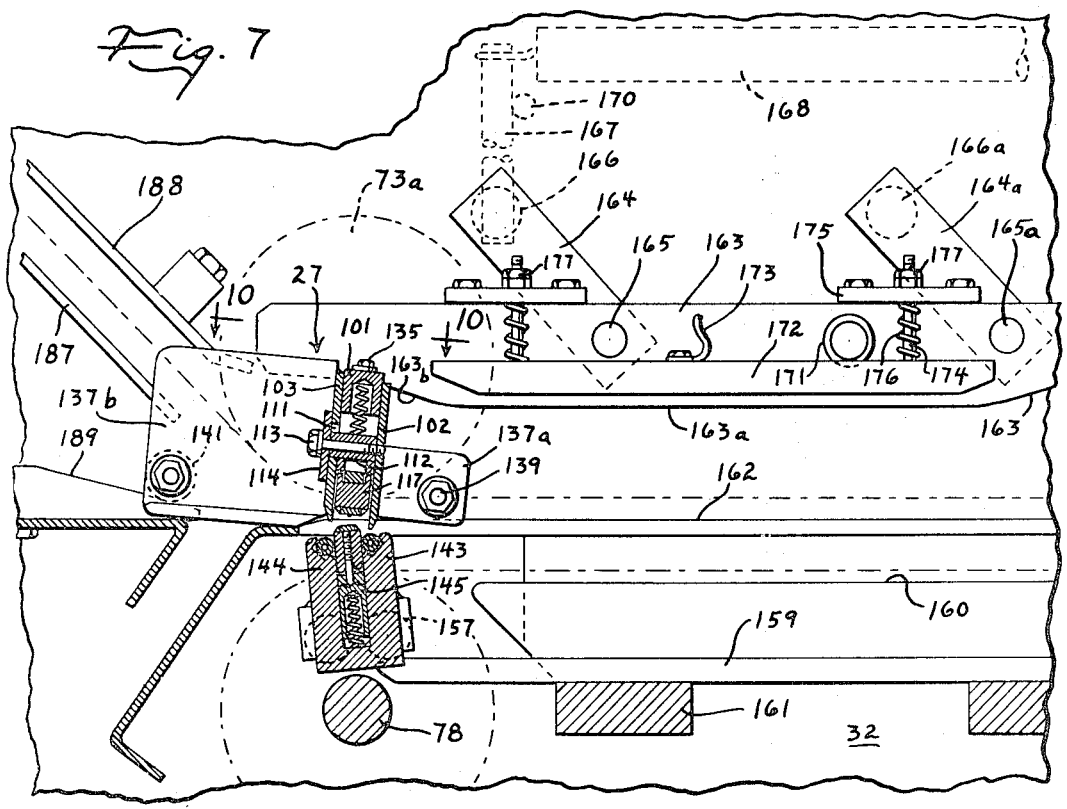

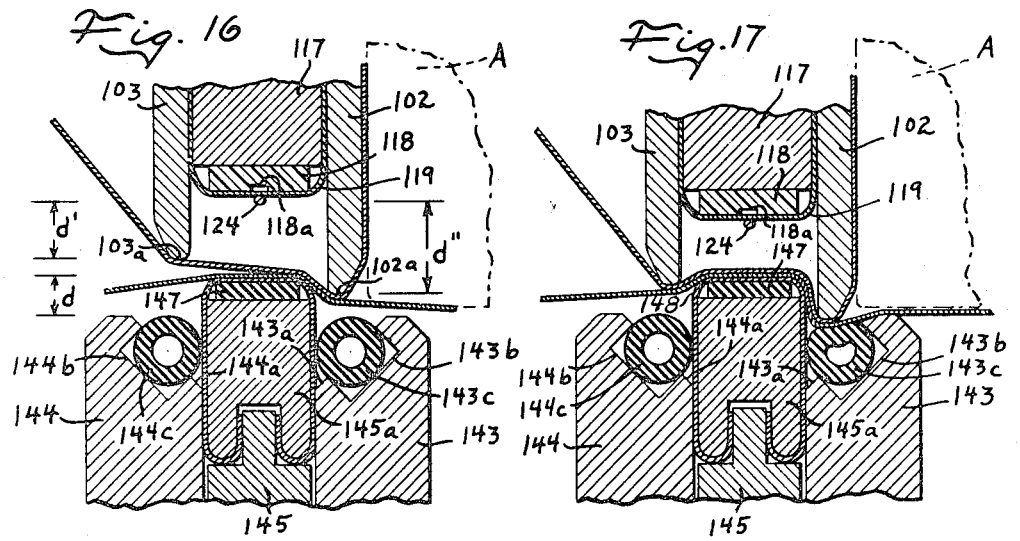
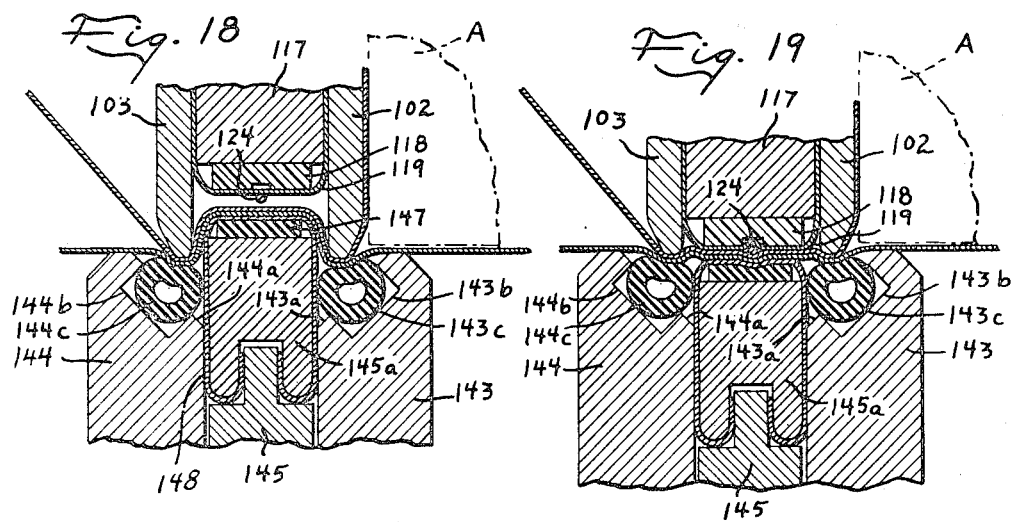
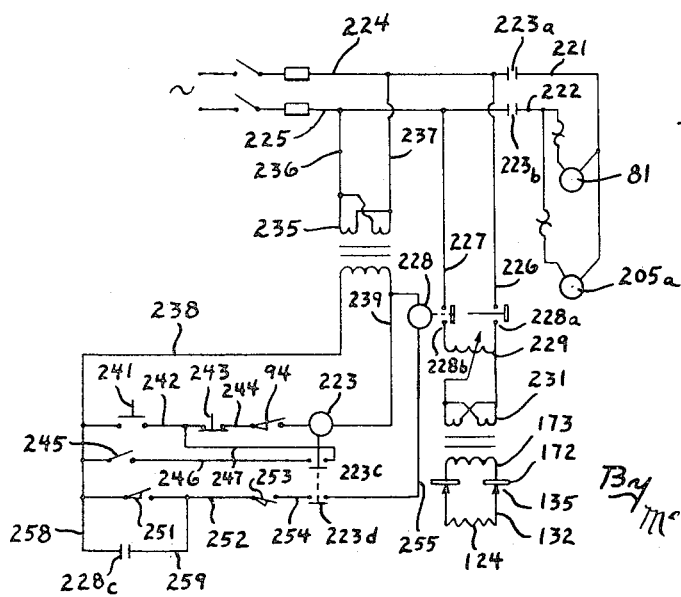

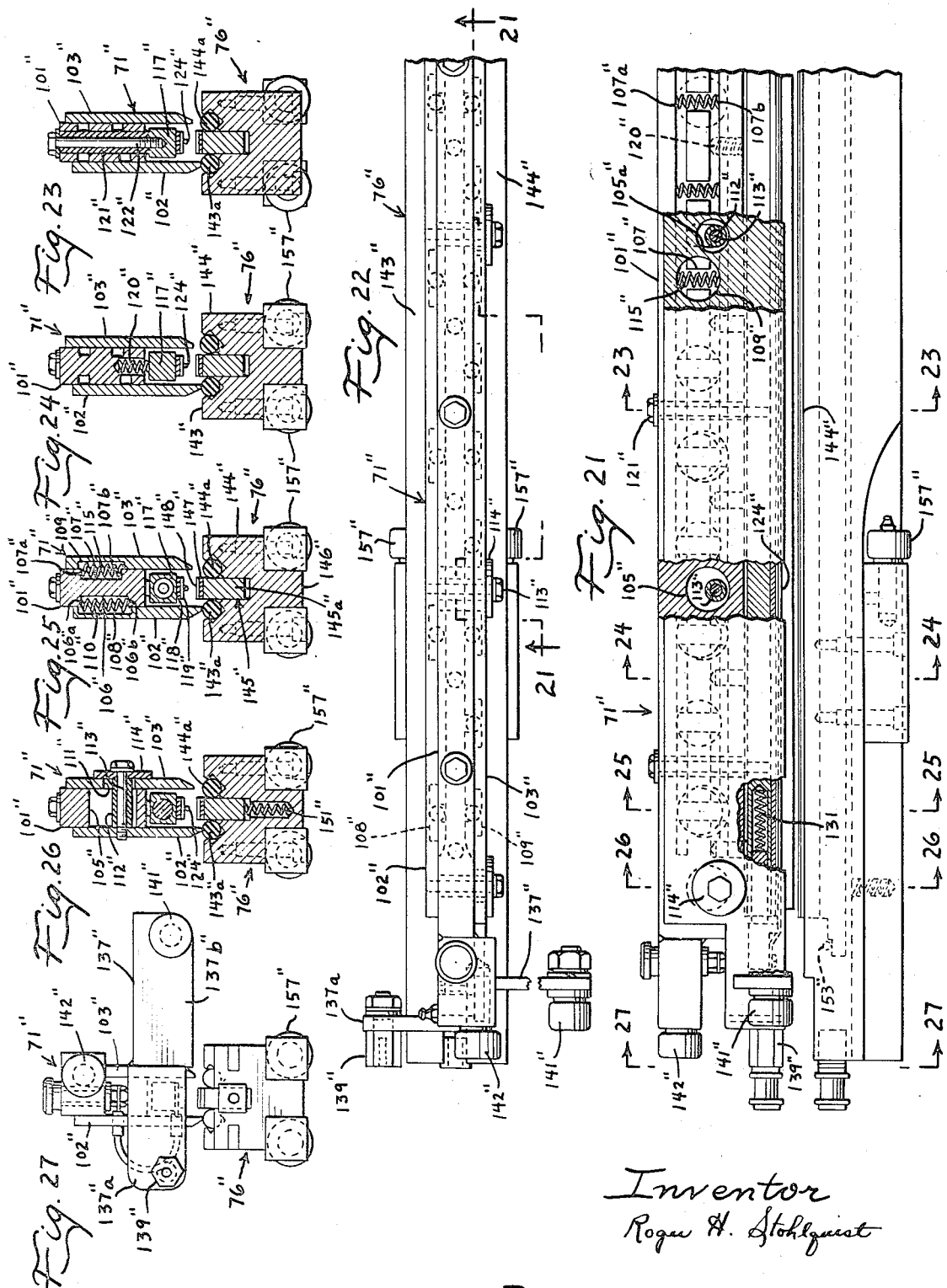

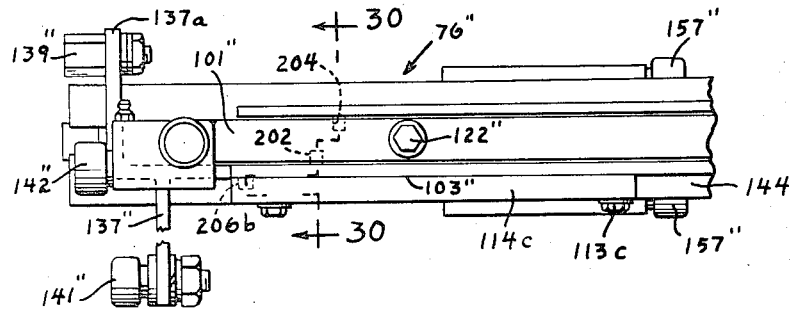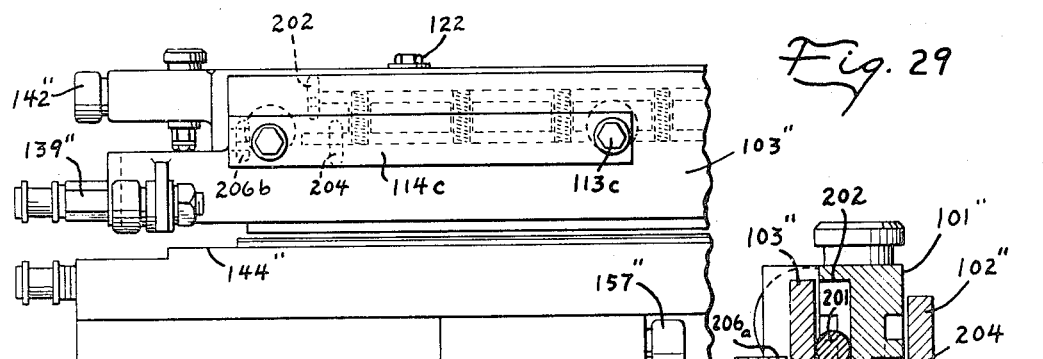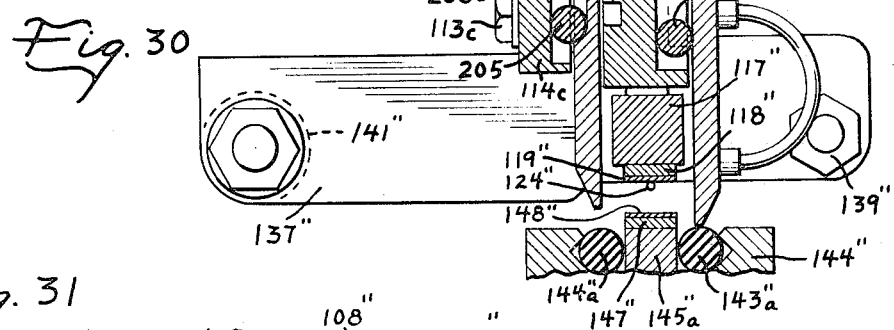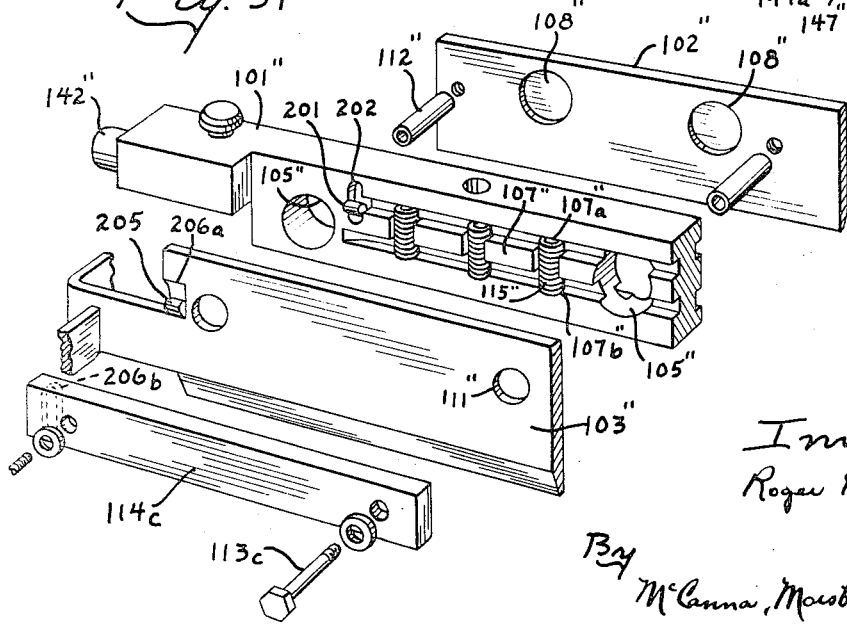

3,553,059
HEAT SEALING APPARATUS
Roger H. Stohlquist, Rockford, Ill., assignor to Anderson Bros. Mfg. Co., Rockford, Ill., a corporation of Illinois
Continuation-in-part of application Ser. No. 618,739, Feb. 27, 1967. This application Dec. 4, 1968, Ser. No. 780,994
Int. Cl. B32b 31/08; B29c 27/06
U.S. Cl. 156—515                                    19 Claims

ABSTRACT OF THE DISCLOSURE

Articles, either singly or in groups, are wrapped by advancing the articles along a path into one side of a curtain of the wrapping material to draw the material across the lead and at least partially along the top and bottom sides of the article. Overlapping portions of the curtain are then brought together closely adjacent the trial side of the article, and the overlapping portions are severed and sealed at opposite sides of the severance by jaws. The jaws have an intermediate sealing jaw and spaced clamping jaws at opposite sides of the sealing jaw supported for limited movement relative to the sealing jaw and relative to each other.

CROSS REFERENCE

This application is a continuation-in-part of my copending application, Ser. No. 618,739, filed Feb. 27, 1967, for "Method and Apparatus for Wrapping Articles," now Pat. No. 3,453,801.

The present invention relates to an apparatus for packaging in webs of heat sealable material and particularly to an improved heat seal jaw assembly for sealing overlapping portions of the webs.

The heat seal jaw assembly includes a sealing jaw and a pair of clamping jaws at opposite sides of the sealing jaw. The clamping jaws are arranged to grip the material at opposite sides of the sealing jaw during the heat sealing operation, to prevent stressing of the material in the region undergoing heat sealing, due to tensions that may be exerted on other portions of the web. The clamping jaws are arranged to sequentially clamp the web, first at one side of the sealing jam and then at the other side of the sealing jaw, to draw the web over the sealing jaw, and then form a slack loop in the material between the clamping jaws to relieve tension on the intermediate portion of the web during the sealing operation. In order to provide a relatively snug wrap of material around the article, it is necessary to seal relatively close to the side of the article. The sealing jaw assembly is constructed and arranged so as to minimize the distance between the outer face of a clamping jaw and the sealing face of the sealing jaw, to allow sealing of the webs relatively close to the side of an article being packaged between the webs.

An important object of this invention is to provide an apparatus for packaging articles in a heat-sealable material having an improved sealing jaw assembly arranged to relieve tensions in the portion of the material during sealing and severing of the material.

Another object of this invention is to provide an apparatus for packaging articles in a heat sealable material having an improved sealing jaw assembly adapted to effect sealing closely adjacent the side of an article being packaged to thereby provide relatively close wrap of the material around the article.

A further object of this invention is to provide a heat seal jaw assembly including a sealing jaw and clamping jaws at opposite sides of the sealing jaw, and having an improved arrangement for yieldably supporting the clamping jaws on the sealing jaw for movement relative to the sealing jaw and relative to each other.

These, together with other objects and advantages of this invention, will be more readily understood by reference to the following detailed description when taken in connection with the accompanying drawings, wherein:

FIG. 1 is a side elevational view of a wrapping apparatus embodying the present invention;

FIG. 2 is a top plan view of the wrapping apparatus of FIG. 1;

FIG. 3 is a fragmentary longitudinal sectional view taken on the plane 3—3 of FIG. 2;

FIG. 4 is a fragmentary vertical sectional view taken on the plane 4—4 of FIG. 3 and showing the parts on a larger scale;

FIGS. 5 and 6 are diagrammatic longitudinal sectional views illustrating the wrapping apparatus in different moved positions;

FIGS. 7, 8 and 9 are fragmentary sectional views illustrating the sealing jaws in different moved positions during the clamping and sealing of the webs;

FIG. 10 is a fragmentary view taken on the plane 10—10 of FIG. 7 illustrating the top of one of the sealing jaws;

FIG. 11 is a fragmentary vertical sectional view taken on the plane 11—11 of FIG. 8 and illustrating the trail side of the sealing jaws during sealing of the webs;

Figure 15:
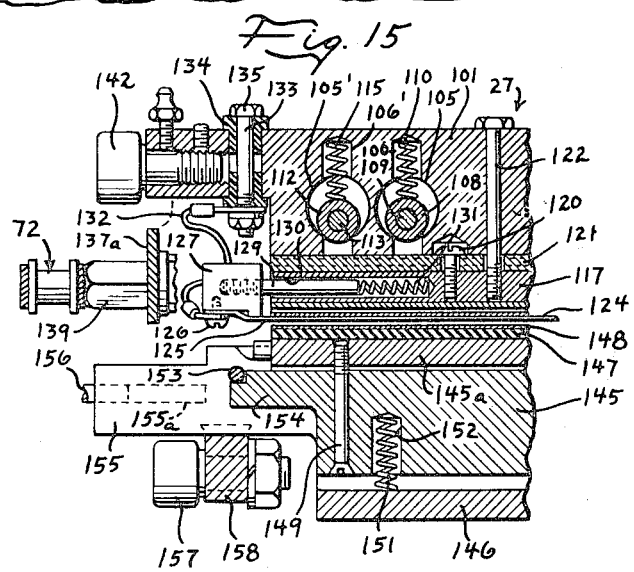

FIGS. 12, 13 and 14 are fragmentary views taken on the planes 12—12, 13—13 and 14—14 through the sealing jaws of FIG. 11;

FIG. 15 is a fragmentary sectional view through the sealing jaws taken on the plane 15—15 of FIG. 10;

FIGS. 16–19 are fragmentary sectional views through the upper and lower sealing jaws, illustrating the same in different moved positions and on a larger scale than FIG. 12;

FIG. 20 is a schematic wiring diagram illustrating the controls for the wrapping apparatus;

FIG. 21 is a side elevational view of a modified form of sealing jaw assembly with parts broken away along one broken section line 21—21 of FIG. 22 to show details of construction;

FIG. 22 is a fragmentary plan view of the sealing jaw assembly of FIG. 21;

FIGS. 23, 24, 25, 26 and 27 are transverse sectional views taken on the planes 23—23, 24—24, 25—25, 26—26, and 27—27 of FIG 21;

FIG. 28 is a fragmentary top view of a further modification form of sealing jaw assembly;

FIG. 29 is a fragmentary side view of the sealing jaw assembly of FIG. 28;

FIG. 30 is a sectional view taken on the broken section line 30—30 of FIG. 28 illustrating the parts on a larger scale; and FIG. 31 is a partial exploded view of the upper jaw member and upper clamping jaws.

The apparatus of the present invention is generally arranged to wrap articles in a web of material which is fusible in the presence of heat, commonly referred to as heat-sealable material. Various different thermoplastic films can be used and, preferably, the heat-sealable films are in the form of heat-shrinkable, biaxially oriented plastic films such as polyethylene, polyvinyl chloride, polypropylene, etc. When heat-shrinkable films are employed, the article is first wrapped in the film and the wrapper on the article is thereafter subjected to heat to shrink the film into tight conformity with the article.

The wrapping apparatus in general includes an inlet conveyor or transfer mechanism 25 for advancing articles A along a path into a curtain of wrapping material; an article suport means 26 adjacent the outlet end of the inlet conveyor means 25 which is constructed and arranged to provide a dwell support for the article advanced thereon; a jaw means 27 movable to draw the film closely along the trail side of the article on the support means and to advance the article by pushing engagement therewith along the support means; a means 28 for supporting a curtain of material to extend crosswise of the article path between the inlet conveyor means and the article support means, and a web feed and tensioning means 29 for feeding material as the articles are wrapped and for retracting the curtain of material after the curtain has been severed from the wrapped article.

The wrapping apparatus also includes a support frame and, in the form shown, the support frame comprises laterally spaced support plates 31 and 32 disposed at relatively opposite sides of the article path and secured at their lower ends to a framework 33 mounted on legs 33a. As best shown in FIG. 1, cross plates 34 and 35 extend between the plates 31 and 32 adjacent the forward and rear ends thereof, and an intermediate cover plate having an upwardly and rearwardly inclined section 36a and a downwardly and rearwardly inclined section 36b extends between the support plates 31 and 32 adjacent the upper ends of the plate members 34 and 35. The inlet conveyor is supported on side members 37, 38 which are secured at one end to the support plates 31 and 32 and are supported at their other ends by legs 39 attached to the lower framework 33.

In the form shown, the inlet conveyor means includes a stationary article support plate 41 which has an outlet end 41a extending to a point adjacent the inlet end of the article support means 26. The plate 41 is supported as by cross members 42 on the side members 37 and 38. The means for moving the articles along the support plate is herein shown in the form of an endless conveyor including a pair of laterally spaced tracks or chains 44. The chains 44 at opposite sides of the apparatus are similarly supported by a set of sprockets 45 and 45a respectively located at the inlet and outlet ends of the support plate 41. The sprockets 45 at the inlet end of the support plate are conveniently secured to a common shaft 40 mounted on the side members 37 and 38, and the sprockets 45a at the outlet end of the support plate are secured to stub shafts 40a rotatably supported in bearings on the side members 37 and 38. Article engaging crossbars 46 are secured to the chains at spaced points therealong and extend between the laterally spaced chains at a level above the article s upport 41 to advance articles therealong. Lateral article guides 48 are mounted to overlie the article support platform 41 and are supported as by slide bars 49 and locking screws 49a for adjustment laterally of the machine.

A curtain of wrapping material is supported to extend crosswise of the path of movement of the articles in a zone intermediate the inlet conveyor means 25 and the article support means 26. The curtain is preferably formed by the end sections of two webs of heat-sealable material designated W and W' which webs are joined together by a heat-sealed joint to form the aforedescribed curtain. The webs W and W' are conveniently supplied from rolls designated R and R' respectively. In the embodiment shown, the rolls R and R' have support shafts 51 and 51' supported on bearings conveniently in the form of spaced rollers 52 and 52' attached to each of the support posts 39. The web W from the roll R is guided upwardly over intermediate rollers 53 and 54 at the end of the apparatus and over a curtain support roller 55 mounted by brackets 55a on the support plates 31 and 32. The web W' from the roll R' is entrained over intermediate rollers 56 and 57 mounted by brackets 58 on the support plates 31 and 32, and the web W' extends forwardly of the inlet conveyor means 25 and is joined to the upper web W.

As is best shown in FIG. 3, the conveyor crossbars 46 advance the articles by pushing engagement therewith until the crossbars pass around the pair of sprockets 45a at the outlet end of the conveyor. The chains 45 are guided so as to extend downwardly and rearwardly at an angle such as to minimize rubbing engagement with the lower web W' and, as shown in FIG. 3, the chains 44 are guided by guides 45b conveniently in the form of stationary cam blocks.

The article support means 26 is constructed and arranged to provide a dwell support for the articles advanced thereon by the inlet conveyor means 25. As used herein, the term "dwell support" refers to a support for the articles which will support the articles in a substantially stationary position after the inlet conveyor has advanced the articles thereon and until the jaw means subsequently operates to engage and continue the advance of the articles. The article support could be in the form of a stationary support plate or, alternatively, an antifriction type support such as a bed of rollers which allows free movement of the articles onto and off of the support means but does not itself advance the same. For reasons pointed out hereinafter, the article support means is preferably in the form of a traveling bed of rollers constructed and arranged to provide the aforedescribed dwell support. More particularly, the traveling bed of rollers includes a pair of laterally spaced lower tracks or chains designated 61 having a plurality of rollers 63 extending between the chains and constructed for free rotation relative to the chairs, about the roller axes 63a. The chains 61 are located at relatively opposite sides of the wrapping apparatus and are supported by similar sets of sprockets, each set including a sprocket 62 at the inlet end of the article support means and a sprocket 62a at the outlet end of the article support means. Although the chains 61 are themselves driven in a manner and for the purpose described hereinafter, the rollers 63 are free to turn about their own axes 63a so as to effectively avoid propelling or advancing the articles supported on the upper run thereof. As will be seen from FIG. 3, the chains 61 support the rollers for movement along an upper run designated 61a in which the upper surface of the rollers is disposed generally coplanar with the inlet article support 41 and the rollers move with the chains in the direction indicated by the arrows in FIG. 3 downwardly around the outlet sprocket 62a, rearwardly along the lower run 61b and then upwardly around the inlet sprocket 62. An outlet guide means, conveniently in the form of a stationary bed of rollers 66, is mounted at the outlet end of the article support means 26 and disposed generally coplanar with the upper run thereof to receive articles as they are advanced off the support means. A means such as an outlet conveyor 67 may be used to advance the articles away from the wrapper and to a shrink tunnel (not shown) if heat-shrinkable wrapping material is used.

The articles designated A, as they are advanced by the inlet conveyor mechanism 25 through the curtain of material and onto the article support means 26, draw the curtain of material along the lead side of the articles and partially along the top and bottom sides thereof. The jaw means 27 is mounted at the other side of the curtain of material and is arranged to draw the curtain closely along the trail side of the article resting on the support means and to advance that article along the support means by pushing engagement therewith while sealing and severing the curtain at the trailing side of the article. The jaw means 27 includes at least one and preferably several upper jaw means designated 71, herein shown four in number, which are mounted for movement in a closed loop course above the article support means 26 and at the side of the curtain opposite the side engaged by the articles as they are advanced by the inlet conveyor. the upper jaw means 71 are mounted on a pair of laterally spaced upper tracks or chains 72 for movement in a closed loop course having a lower run 72b, and upper run 72d and forward and rear runs 72a and 72c respectively which extend between the upper and lower runs adjacent the forward and rear ends of the closed loop course. The chains 72 at each side of the machine are guided for movement in the closed loop course by similar sets of rollers or sprockets, each set preferably including four sprockets designated 73a–73d. The sprockets 73a and 73b of each set guide the chains during movement along the lower run 72b so that the lower run extends generally parallel to at least a portion of the upper surface of the article support means 26, and the sprockets 73c and 73d of each set guide the chains during movement through the uper run 72d and space the upper run above the article support a distance greater than the height of the articles to be wrapped so that the jaw means clears the articles during return movement of the jaws. As will be appreciated, the upper jaw means moves laterally toward the article path as it traverses the inlet run 72a and laterally away from the article path as it traverses the outlet run 72c and, in order to allow the aforedescribed lateral movement of the jaws with respect to the article path while the articles are advancing, the inlet and outlet runs are preferably arranged to respectively converge and diverge with respect to the article path. Thus, the sprockets 73d are positioned relative to the sprockets 73a such that the run 72a is inclined downwardly and forwardly toward the article path preferably at an angle of around 45° and, similarly, the sprockets 73c are positioned relative to the sprockets 73b such that the rear run 72c is inclined upwardly and forwardly preferably at an angle of around 45°. With this arrangement, the upper jaw means moves forwardly with the articles as the jaw means moves laterally inwardly and outwardly relative to the path of travel thereof. The inlet run 72a is arranged with relation to the position to which the trail side of the article is advanced by the inlet conveyor means (shown in FIG. 5) such that the path of movement of the upper jaw means along the inlet run 72a intersects the trail side of the article A in this position. Thus, the upper jaw means moves downwardly and forwardly until it engages the trail side of the article on the article support means 26 to thereby draw the web of material closely along the trail side of the article and the uper jaw means thereafter advances in "pushing engagement" with the article with the web of material intervening between the upper jaw and the trail side of the article as shown in FIGS. 6 and 17–19 to thereby advance the article along the support means as the upper jaw means continues movement along the lower run 72b. A means is provided for clamping overlapping portions of the webs W and W' against the upper jaw means 71 after the upper jaw means engages the trail side of the article on the support means and while the upper jaw means moves along at least a portion of its lower run 72b. This web clamping means preferably comprises a lower jaw means 76 which is mounted for movement with the upper jaw means as the latter moves along its lower run. The upper and lower jaw means can be arranged in relation to each other so as to effect clamping and sealing of the webs at any selected level between the top and bottom of the articles. In the preferred embodiment illustrated, the upper and lower jaw means are arranged to effect a seal adjacent the bottom of the article and for this purpose are arranged so as to clamp the webs together at a level adjacent the bottom of the article. In order to clamp the webs together adjacent the level of the bottom of the articles, the lower jaw means must be disposed at about the level of the article support means and, for this purpose, the lower jaw means 76 are attached to the lower chains 61 for movement therewith and are located between certain of the rollers 63 on the chains. Thus, the lower jaw means 76 can move in unison with the upper jaw means 71 while the latter traverses its lower run 72b and the aforedescribed traveling bed of rollers accommodates this movement of the lower jaw means while yet providing the desired dwell support for the articles when the latter are not being pushed by the jaw means. Alternatively, if the jaw means were arranged to seal at a level above the bottom of the artilces, the lower jaw means could be mounted for movement in a plane above the article support means, and in this event, it would be unnecessary to provide a traveling bed of rollers. The course traversed by the lower jaw means can be shorter than that of the upper jaw means and, in the embodiment shown, is one-half the upper jaw course. With this arrangement, only two lower jaws need be provided with each lower jaw means arranged to move into opposed registry with alternate ones of the upper jaw means as the latter traverses its lower run. Stated otherwise, the spacing between the lower jaw means on the chains 61 is made the same as the spacing between the upper jaw means on the chains 72 although the lengths of the two chains are different. The upper and lower jaw means are driven in timed relation with each other so that they move substantially in unison as the upper jaw means traverses its lower run. The lower sprockets 62 at opposite sides of the machine are conveniently nonrotatably secured to a cross shaft 78, and the lower sprockets 62a at opposite sides of the machine are similarly nonrotatably secured to a cross shaft 78a, the ends of which shafts are rotatably supported by bearings in the upport plates 31 and 32. These cross shafts extend between the respective sprockets at opposite sides of the wrapping machine and thus drive both chains 61 in unison. However, to avoid interference with the movement of the articles and the web, the sprockets 73a–73d of each set at opposite sides of the wrapping machine are nonrotatably secured to stub shafts 79a–79d respectively, and which stub shafts do not extend across the machine but are instead independently supported by bearings in the respective support plates 31 and 32. As best shown in FIGS. 1, 2 and 4, the jaw means are driven by a drive means including a motor 81 connected through a variably speed drive comprising an adjustable diameter pulley 82, belt 83 and adjustable diameter pulley 84, connected to the input of a transmission 85. The transmission 85 is of the speed reducing type and is preferably arranged to stop the machine in the event of overload. For this purpose, the transmission output is nonrotatably connected to one of the shafts 78a, but the transmission is itself free to turn about the axis of the shaft, except as constrained by a spring 93 acting on a lever 92 secured to the transmission. The spring normally urges the lever 92 against a stop 92a. However, if the load on the drive shaft 78a becomes excessive for any reason and overcome the tension of spring 93 acting on lever 92, the transmission 85 will turn with the shaft 78a in a counterclockwise direction as viewed in FIG. 1 to raise the lever. A switch 94 is mounted with its actuator 94a in the path of movement of the lever 92 to be operated thereby when the lever is raised. The switch is arranged as descibed hereinafter to stop the drive motor 81.

A sprocket 86 is nonrotatably secured to the shaft 78a adjacent each side of the machine, and these sprockets are connected through similar drive chains 87 at each side of the machine to drive sprockets 88 and 89 on the stub shafts 79c and 79b. As will be seen from the arrows in FIG. 1, the drive chain 87 are arranged so as to rotate the drive sprockets 88 and 89 in a direction opposite the direction of rotation of the sprocket 86 so that the lower chain 61 and the upper chain 72 have their upper ana lower runs 61a and 72b respectively moving in a forward direction. An idler sprocket 90 is provided at each side of the machine and mounted on an adjustable bracket 91 to enable adjustment of the tension in the respective drive chain 87. The upper and lower chains 72 and 61 at opposite sides of the machine are thus drive in unison from the shaft 78a under the control of the clutch in transmission 85.

The inlet conveyor 25 is advantageously driven in timed relation with the upper and lower jaw means so as to advance an article into position onto the article support means 26 slightly in advance of the time the upper jaw means engages the trail side of the article at the support means. The inlet conveyor is preferably driven at the same linear speed as the upper jaw means 71 during movement of the same along the lower run 72b of its course. As previously described, the sprockets 45a at the outlet end of the inlet conveyor are mounted on stub shafts 40a supported by bearings in the support plates 31 and 32, and each of the stub shafts 40a is connected through a sprocket 98 and chain 97 to respective ones of sprockets 96 nonrotatably secured to one of the cross shafts 78.

HEAT SEAL JAW ASSEMBLY

The upper jaw means 71 and lower jaw means 76 are arranged to clamp the overlapping portions of the curtain therebetween at the trail side of the article and to advance the article in pushing engagement with the trail side of the article during movement of the jaw means along the lower run 72b. The jaw means are also arranged to sever the overlapping portions and to heat-seal the same at opposite sides of the severance so as to seal the wrapper at the trail side of the article and to rejoin the webs to re-form the curtain. The jaw means then the releases the webs and a means is provided for retracting the webs after release by the jaw means so that the curtain can engage the lead side of the next succeeding article. When several jaw means 71 are provided on the upper tracks 72 such as the four jaw means illustrated in the present embodiment, each of the jaw means 71 is spaced along the length of the tracks 72 a distance greater than the distance through which the upper and lower jaw means 71 and 76 are maintained in clamping engagement with the webs during movement along the lower run 72b so that one jaw means will release the webs at the trail side of one article before the succeeding jaw means clamps the webs at the trail side of the succeeding article.

One form of the jaw means is illustrated in FIGS. 10–19. Each of the upper jaw means 71 includes a jaw member 101 conveniently in the form of a relatively thick bar and forward and rear clamping jaws 102 and 103, conveniently in the form of relatively flat plates which overlie the front and rear sides of the jaw member 101. As used herein, the forward side of the jaw means is the side which leads during movement of the upper jaw means 71 along the lower run 72b of the closed loop course. The front and rear clamping jaws are supported for movement relative to the jaw member 101 and, for this purpose, the jaw member is formed with first and second sets of spring receiving cavities, herein shown formed by enlarged openings 105 and 105' which extend through the jaw member from the front to rear sides thereof and bores 106, 106' which extend upwardly in the jaw members, intersect the respective openings 105, 105' and terminate below the top of the jaw members. As best shown in FIGS. 12 and 15, stop blocks 108 are secured to one of the clamp jaws such as 103 by fasteners 109, and the stop blocks extend into respective ones of the first set of openings 105. The cross section of the stop blocks is smaller than the openings 105, and springs 110 are disposed in the bores 106 that intersect the aforementioned openings and engage the stop blocks 108 to yieldably urge the stop blocks and the clamp jaw 103 downwardly until the stop blocks engage the lower side of the openings 105. The other clamp jaw 102 is supported for movement relative to the jaw member 101 and also for limited movement relative to the rear clamp jaw 103. As best shown in FIGS. 13 and 15, the clamp jaw 103 has openings 111 therein in the portions that overlie the second set of openings 105' in the jaw member 101. A stop member 112 is disposed in each of the last mentioned set of openings, which stop members are secured to the front jaw 102 by fasteners 113. Each stop member 112 has a length sufficient to extend from the inner side of the front clamp jaw 102 through the respective opening 105' in the jaw member and through the opening 111 in the rear clamp jaw 103, and enlarger washer 114 overlies the rear end of the stop member 112 and is retained in position by the head on the fastener 113. Springs 115 are disposed in the bores 106' and engage the stop members 112 to yieldably urge the forward clamp jaw downwardly relative to the jaw member 101. The openings 111 in the rear jaw 103 are made sufficiently larger than the cross section of the respective stop members 112 to allow limited vertical lost motion therebetween so that the front jaw can move relative to the rear jaw.

A sealing jaw face is provided on the jaw member 101 between the front and rear clamping jaws. In the embodiment shown, the sealing jaw face is formed by an elongated rigid bar 117 having a strip 118 of dielectric material, preferably of a non-yielding heat-resistant plastic material. The bar and strip 118 are preferably covered with a wear-resistant covering such as a flexible layer of "Teflon" impregnated fiberglass indicated at 119 which overlies the lower face of the strip 118 and extends along the sides of the bar 117 and has the ends thereof clamped to the upper side of the bar 117 by a clamp member 121 and fasteners 120 (see FIGS. 9 and 15). The bar 117 is clamped to the jaw member 101 by fasteners 122 which extend through the member 101 from the top thereof and are threaded into the bar 117, as best shown in FIGS. 11 and 15. A heat-sealing and cutting element is mounted to overlie the sealing face and, in the form shown, comprises an electrical resistance wire of "Nichrome" or the like designated 124. Connectors straps 125 are brazed or otherwise secured to the ends of the wire and attached as by connector screws 126 to an electrically insulative block 127. The resistance wire 124 is adapted to be impulse heated, that is, heated by a short duration pulse of current therethrough, and provision is made for accommodating the expansion and contraction which occurs in the heated wire. As shown in FIG. 15, the connector block 127 at each end of the wire is secured to a guide rod 129 which is slidably received in a bore 130 in the bar 117, and a spring 131 is disposed in the bore to yieldably urge the guide rod 129 and connector block outwardly to tension the wire 124. As shown in FIGS. 16–19, the insulating strip 118 preferably has a shallow groove 118a therein in the region that underlies the wire 124 and which has a width slightly greater than the width of the wire and a depth less than the thickness of the wire so as to tend to maintain the heater wire centered on the sealing face.

A sliding brush arrangement is provided for supplying current to the resistance wire during movement along the lower run 72b and, as shown in FIG. 15, a wire 132 is connected by the screw fastener 126 to the resistance wire and is otherwise connected to a fastener 133 that extends through insulating plugs 134 in the jaw member 101, the outer end 135 of which member forms a brush element for cooperation with a conductor shoe to be described hereinafter.

The upper jaw means 71 are mounted on the chains 72 for movement therewith and for limited swinging movement relative thereto about an axis offset from one side, and preferably the lead side, of the jaw means. For this purpose, a jaw mounting bracket 137 is secured to the jaw means, preferably by welding to the rear clamp jaw 103, and which bracket has a portion 137a projecting forwardly of the jaws. The chains 72 are formed with laterally extending pins 138 at spaced points therealong, and a socket member 139 is attached to the forwardly extending portions 137a of each of the brackets to pivotally receive one of the pins 138. For reasons pointed out hereinafter, the bracket 137 also includes a portion 137b that extends rearwardly from the jaw means and which rearwardly extending portion has a guide roller 141 mounted thereon at a point laterally offset from the jaw members. As best shown in FIG. 10, the portion 137b of the jaw mounting bracket is offset inwardly from the portion 137a, and the guide roller 141 is mounted thereon for movement in a plane offset inwardly from the path of movement of the chains. A roller 142 is also mounted on each end of the jaw member 101 and, as also best shown in FIG. 10, is disposed in a plane offset outwardly from the plane of movement of the rollers 141.

The lower jaw means 76 also includes front and rear clamping jaw members 143 and 144 and an intermediate sealing jaw member 145. The clamping jaw members 143 and 144 and the sealing jaw member 145 are supported for relative movement and, in the form shown, the clamping jaw members 143 and 144 are rigidly interconnected by a crosspiece 146 adjacent their lower ends to form a generally U-shaped configuration, and the sealing jaw member 145 is slidably mounted between the clamping jaw members. The sealing jaw member also includes a rigid jaw back-up member 145a having a dielectric strip 147, preferably of resilient heat-resistant material such as "Neoprene" rubber, overlying the outer face thereof. A flexible cover 148, for example of "Teflon" impregnated fiberglass, extends over the strip 147 and along the sides of the back-up member 145a, and the ends of the strip are clamped between the back-up member and the sealing jaw member 145 by screw fasteners 149 which extend through the jaw member 145 and are threaded into the back-up member 145a, as best shown in FIG. 15. Springs 151 are disposed in bores 152 in the jaw member 145 and engage the crosspiece 146 to yieldable urge the sealing jaw member outwardly relative to the clamping jaws, and stop pins 153 are secured to the clamping jaws and extend therebetween to engage a projection 154 on the jaw member to limit outward movement of the latter. The clamping jaw members are preferably formed with resilient jaw faces for cooperation with the clamping jaws of the jaw means 71 and, as best shown in FIGS. 16–19, the clamping jaw members 143 and 144 have inwardly canted faces 143a and 144a respectively; recesses 143b and 144b, the base of which is also canted as previously described; and resilient, preferably tubular members 143c and 144c of resilient rubber or plastic material disposed in the recesses and projecting thereabove. The tubular members form resilient jaw faces which are yieldably deformable under the clamping pressures encountered when the clamping jaw members of the upper jaw means 71 are pressed thereagainst.

The lower jaw means is connected to the lower chains 61 for movement therewith. In the embodiment shown, the clamping jaw members 143 and 144 are formed with spaced end portions 155 and drive blocks 155b are attached to the lower chains 61 at spaced points therealong and dimensioned for reception between the end portions 155 to advance the lower jaw means with the chains 61. Spaced pins 156 are also provided on the chains 61 at opposite sides of each drive block and arranged to extend into grooves 155a in the outer faces of the end portions 155 to support the lower jaw means against movement laterally of the chains. Spaced guide rollers 157 are mounted by a bracket 158 at each end of the jaw means 76 and a guide shoe 159 is mounted as by brackets 161 on each of the support plates 31 and 32 for engaging the rollers 157 to guidably support the jaws 76 during movement along the upper run 61a of the chain (See FIGS. 3 and 7–9). A chain guide 160 is conveniently mounted on the brackets 161 to support the lower chains during movement along their upper runs.

As the upper jaw means 71 move along the lower run 72b thereof the upper jaw means are supported at a point rearwardly thereof by the rollers 141 riding on guide rails 162. However, the connection of the jaw means to the chains 72 at a point forwardly thereof provides a floating support which accommodates limited vertical movement of the upper jaw means due to flexing of the chains 72. During movement of the upper jaw means along the lower run 72b, they are pressed downwardly into clamping engagement with the lower jaw means by a pressure-applying cam 163. The pressure-applying cam extends generally lengthwise of the lower run and is advantageously supported for parallel movement relative thereto by a parallelogram-type linkage including generally parallel arms 164 and 164a which are pivotally connected to the cam member 163 by pins 165, 165a at spaced points along the cam, and which arms are pivotally supported on the respective support plates 31 and 32 by stub shafts 166 and 166a. A lever 167 is nonrotatably secured to one of the stub shafts such as 166, and a spring 168 is terminally attached to the lever and to an anchor 169 to yieldably urge the arms in a direction to press the cam member 163 downwardly. A stop 170 is provided for limiting downward movement of the cam member and, as shown in FIG. 7, engages the lever 167. Each cam member has an elongated pressure-applying surface 163a at its underside; a contoured inlet cam track 163b and a contoured outlet cam track 163c. The cam member is positioned in the path of movement of the rollers 142 on the sealing jaw members 101 as they move along the lower run thereof and operates to press the sealing jaw member downwardly as described more fully hereinafter.

The stop pins 153 and projections 154 on the sealing jaw member 145 of the lower jaw assembly are constructed and arranged so as to limit outward movement of the lower sealing jaw to a position in which the outer face thereof is spaced a preselected distance indicated at $d$ in FIG. 16 from the outer face of the lower clamping jaw members. In the upper jaw means 71, the stop blocks 108 are arranged to engage the lower side of the openings 105 and limit outward movement of the rear clamping jaw 103 to a position in which the clamp face 103a thereof projects a distance indicated at $d'$ from the face of the upper sealing jaw, and which distance $d'$ is advantageously made greater than the distance $d$ previously described. The front clamping jaw 102 is supported for limited movement relative to the sealing jaw member 101 and relative to the rear clamping jaw 103, and the stop blocks 112 are arranged to engage the lower edges of the openings 105' to limit outward movement of the front clamping jaw to a position in which the clamp face 102a thereof projects a distance indicated at $d''$ which is greater than the projection $d'$ of the rear clamp jaw. The pressure-applying cam 163 is arranged so as to engage the rollers 142 on the upper jaw member to begin clamping of the web between the upper and lower jaw means only after the upper jaw means has engaged the trail side of the article on the article support means 26. As the roller rides along the underside of the inlet cam track 163b, the jaw member 101 is pressed downwardly as shown in FIGS. 7 and 16 and operates to first clamp the overlapping portions of the webs between the front clamping jaws 102 and 143 as shown in FIG. 17; then clamp the webs between the rear clamping jaws 103 and 144 as shown in FIG. 18, to draw the wrapping material over the top of the lower sealing jaw member 145; and to thereafter press the upper sealing jaw member downwardly relative to the front and rear clamping jaws 102 and 103 to bring the heat-sealing wire 124 into pressure contact with the overlapping webs between the clamping jaws and to depress the lower sealing jaw as shown in FIG. 19 to a position in which the upper surface of the sealing jaw is more nearly coplanar with the clamp faces 102a and 103a. This relieves the tension in the portions of the webs between the clamp jaws, and the upper and lower jaw means are maintained in the relative positions shown in FIG. 19 as the roller 142 rides along the pressure-applying surfaces 163a. The resistance wire 124 is energized during at least a portion of the time that the roller 142 is riding on the pressure-applying surface 163a to thereby sever and seal the overlapping portions of the webs while the web tension is relieved. As the roller thereafter rides along the outlet cam track 163c, the upper jaw member 101 is allowed to move upwardly relative to the front and rear clamping jaws 102 and 103 so that the upper sealing jaw moves away from the overlapping webs. However, when the machine is operated at high speeds, the upper jaw member tends to spring upwardly and tilt forwardly about the pins 138 when the rollers 142 ride along the outlet cam track 163c. In order to inhibit this forward tilting of the upper jaw means, rollers 171 are mounted on the cam tracks 163 and arranged to engage the upper edge of the portion 137b of the jaw mounting brackets 137 while the rollers 142 on the upper jaw means ride along the outlet portions 163c of the cam tracks 163.

Figure 9:
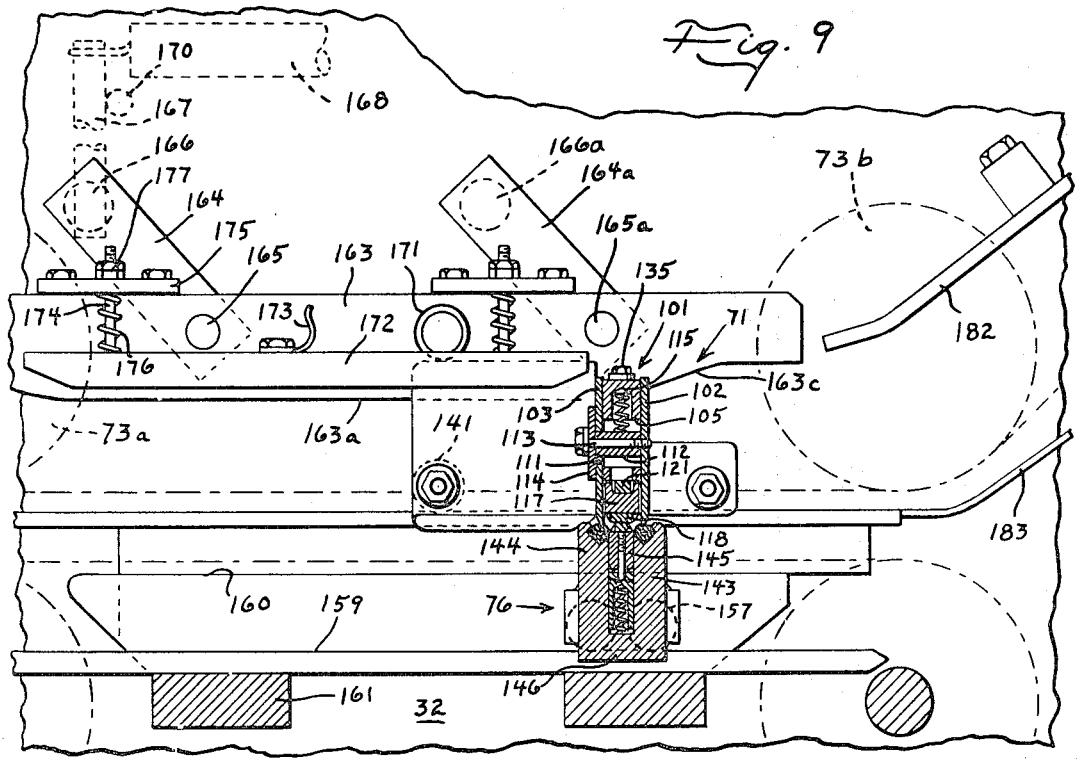

Although the resistance wire could be of the continuously energized type, it is preferably intermittently or pulse energized. As best shown in FIGS. 7–9, an electrically conductive shoe 172 is mounted in the path of movement of the brushes 135 at each end of the upper jaw means 71, and the shoes are connected through conductors 173 to a power supply means described hereinafter. The electrically conductive shoes 172 are conveniently yieldably mounted on the respective pressure-applying cam 163 and, as shown, guide rods 174 are attached to the shoe and slidably extend through insulating supports 175 attached to the pressure-applying cam. Springs 176 yieldably urge the shoe 172 downwardly, and stops 177 are attached to the guide pins to limit downward movement of the shoe.

Since the forward and rear clamping jaws 102 and 103 of the upper jaw means normally project outwardly of the wire 124 on the upper sealing jaw, it will be seen that the sealing wire is at least partially enclosed by the clamping jaws. Guide means are advantageously provided for controlling the attitude of the upper jaw means 71 during movement along the closed loop course. As shown in FIG. 3, guide rails 182 and 183 are mounted above and below the run 72c of the chain and are arranged to respectively engage the rollers 142 and 141 on the upper jaw means. The guide rails 182 and 183 are preferably inclined at a somewhat shallower angle than the run 72c to allow the upper jaw means 71 to tilt downwardly as it moves along the run 72c. The rail 182 extends generally tangent to the hub 73c' of the sprocket 73c and, as the chain passes around the sprocket, the roller 142 engages the hub to guide movement of the upper jaw means. The upper jaw means is substantially inverted as the chain passes around the sprockets 73c and an auxiliary chain guide 184 is provided to extend around the chain as it passes over the sprockets 73c. The auxiliary chain guide is arranged to underlie the roller 141 on the upper jaw means during movement of the latter around the sprocket, and to aid in preventing downward swinging movement of the jaw means. An upper guide rail 186 is provided along the upper run 72d of the chain to underlie the path of movement of the roller 142 and support the jaws in a position as shown in FIG. 3 during movement along the upper run. A forward guide rail 187 extends from a point above the sprockets 73d around the outer periphery of the chain and then downwardly below the chain. The rollers 142 on the upper jaw means engage the upper side of the guide rail 187 and support the jaw means in a generally upright attitude as shown in FIG. 5, as the jaw means moves along the forward run 72a of the chain. A rail 188 overlies the path of movement of the rollers 142 during movement along the forward run 72a to prevent the jaw means from accidentally swinging upwardly. As best shown in FIG. 7, a guide track 189 is positioned to engage the roller 141 on the upper jaw means as the jaw means move toward their clamping position to support the upper jaw means at the trail side thereof and maintain the upper jaw means out of claimping engagement with the webs until the upper and lower jaw means have advanced to a position in which they are in substantial opposed relation.

The modified form of heat seal jaw assembly illustrated in FIGS. 21–27 is generally similar to that shown in FIGS. 10–19 and like numbers followed by the postscript (″) are used to designate corresponding parts, As in the preceding embodiment, the forward and rear clamping jaws 102″ and 103″ of the upper jaw means 71″ are in the form of plates slidably mounted at opposite sides of the intermediate jaw member 101″ for movement relative to the intermediate jaw member and relative to each other. As best shown in FIGS. 21, 22 and 26, the intermediate jaw member has openings 105″ extending therethrough and fasteners 113″ are attached to the forward clamp jaw 102″ and extend through openings 105″ and through registering opening 111″ in the other clamp jaw 103″. A clamp jaw retainer, herein shown in the form of a washer 114″ or the like, is interposed between the head on the fastener and the rear clamp jaw to hold the clamp jaws in assembled relation on the intermediate jaw. A spacing sleeve 112″ is preferably provided between jaw 102″ and the washer 114″ and the openings 105″ and 111″ are made larger than the spacing sleeve in a direction crosswise of the jaw member 101″ to allow limited transverse movement of the clamp jaws relative to the intermediate jaw and relative to each other. At least one of the openings in the intermediate jaw designated 105a″ in FIG. 21 is made in the form of a slot which guidably receives spacing sleeve 112″ to inhibit relative longitudinal movement between the clamp jaws and intermediate jaw member while permitting the aforementioned limited transverse movement. However, to simplify machining, others of the openings 105″ can be in the form of circular bores as shown in FIG. 21. In order to reduce tilting and binding of the clamping jaws during movement relative to the intermediate jaw member, it has been found advantageous to locate the springs for biasing the clamping jaws adjacent their plane of movement. In this embodiment, one set of spring receiving cavities 106″ is formed in the lead side face of the intermediate jaw member and a second set of spring receiving cavities 107″ is formed in the trial side face of the intermediate jaw member. The cavities 106″ and 107″ are spaced along the jaw member 101″ and have end faces 106a″, 106b″ and 107a″, 107b″ disposed substantially perpendicular to the side faces of the jaw member. These cavities can conveniently be formed by milling cross slots at spaced points along the jaw member with lengthwise milled slots extending across the ends of the cross slots to provide the aforementioned perpendicular end faces for the cross slots. The front clamping jaws 102″ have a first set of cavities 108″ that register with the cavities 106″ and rear clamping jaws have a second set of cavities 109″ that register with the cavities 107″ to form spring receiving chambers. A first set of coil type compression springs 110″ are disposed in the cavities 106″ and a second set of coil type compression springs 115″ are disposed in the cavities 107″ with their axes paralleling the side faces of the intermediate jaw member. The cavities 108″ and 109″ are formed to have an effective length measured in a direction crosswise of the jaw member approximately equal to the spacing between the end faces 106a″, 106b″ and 107a″, 107b″ of the respective cavities 106″ and 107″ in the intermediate jaw member. It is not necessary that both registering cavities 106″, 108″ and 107″, 109″ be shaped in the form of a slot to guide the spring and, to facilitate manufacture, the cavities 108″ and 109″ are conveniently in the form of circular milled recesses having a diameter to receive the ends of the springs disposed in the registering cavities in the intermediate jaw member. As will be seen, the springs 110″ and 115″ normally position the respective clamping jaws 102″ and 103″ in the position shown in FIG. 25 with the ends of the cavities in the clamp jaws substantially coterminal with the ends of the respective cavities in the intermediate jaw member. Moreover, the line of action of the springs 110″ and 115″ is substantially in the plane of movement of the clamping jaws so as to minimize any tendency of the clamp jaws to tilt and bind during movement relative to the intermediate jaw member. As in the preceding embodiment, the clamp jaws are arranged to sequentially clamp the film and for this purpose, the forward clamp jaw, that is the clamp jaw disposed adjacent the side of the package being wrapped, is normally positioned with its clamp jaw face offset a relatively greater distance from the intermediate jaw member than the other clamp jaw face. The forward clamp jaw moves a relatively greater distance than the rear clamp jaw during clamping of the webs of material and the spring receiving cavities 106" are preferably made correspondingly longer than the cavities 107". This allows use of the same springs in both sets of cavities. However, in the apparatus disclosed wherein the jaw means advances the wrapped articles while sealing the webs, it has been found advantageous to use a greater number of springs on the rear clamp jaw 103" to prevent withdrawal of the webs from the jaw assembly as the latter advances. The roller 142", which is adapted to engage cam 163 to apply sealing pressure, is preferably offset toward the rear side of the intermediate jaw member as shown in FIGS. 22 and 27 to be more nearly aligned with the rear jaw member, to minimize the tendency of the upper jaw assembly to tilt during clamping, due to the unequal clamping pressures on the forward and rear clamp jaws. The upper jaw assembly is supported on the chain 72 by a socket member 139" attached to the jaw mounting bracket 137" at a point forwardly of the jaw assembly and a roller 141" is provided on the bracket 137" rearwardly of the jaw assembly for engagement with the cam tracks 183–187. A sealing jaw face is provided on the upper jaw assembly and includes a rigid bar 117" having a strip 118" of preferably non-yielding dielectric material affixed thereto as by adhesive and covered by a wear resistant cover 119" of fiber glass or the like, also conveniently affixed to the strip 118" by adhesive. The heat sealing and cut-off wire 124" is tensioned over the outer face of the cover by springs 131, in the manner described in connection with FIGS. 10–19. The sealing jaw face is preferably resiliently mounted to allow the upper sealing jaw member to deflect into conformity with any deflection in the lower sealing jaw member and, as shown in FIG. 23, is supported by fasteners 122" and guide bushings 121" on the intermediate jaw member for limited movement relative thereto, and compression springs 120" are disposed between the intermediate jaw member and the sealing jaw face, as shown in FIG. 24. The number and stiffness of the srings 120" is selected in relation to the springs 100", 115" and 151" so that the springs 120" yield after jaw assemblies have clamped the film therebetween and depressed the lower sealing jaw as shown in FIG. 19. This allows the upper sealing jaw to conform to any deflection in the lower sealing jaw.

The lower jaw means is substantially the same as previously described in connection with FIGS. 10–19 and includes front and rear clamping jaws 143" and 144" rigidly interconnected and a sealing jaw member 145" slidably mounted between the sealing jaw members. The sealing jaw member has a sealing jaw face with a resilient layer 147" of rubber or the like and a heat resistant cover 148", and the layer 147" is conveniently adhesively attached to the jaw member and to the cover. The jaw member is resiliently supported by springs 151" and stops 153" (FIG. 21) are provided at the ends of the intermediate jaw member to limit outward movement of the jaw member 145". The clamp jaws 143" and 144" have resilient jaw faces 143a" and 144a" cooperable with the clamp jaws on the upper jaw assembly. The lower jaw assembly is mounted on the lower endless chains 61 for movement therewith in the manner described in connection with FIGS. 10–19 and rollers 157" is provided for supporting the lower jaw during sealing. In this embodiment, however, the rollers 157" are located inwardly of the ends of the lower jaw assemblies to minimize longitudinal deflection under sealing pressures, and the tracks 159 shown in FIG. 3 must be correspondingly moved inwardly to underlie the rollers 157", when this arrangement is used.

The jaw assembly illustrated in FIGS. 28–31 is the same as that illustrated in FIGS. 22–27, except for the addition of anti-friction elements between the clamping jaws and intermediate jaw member of the upper jaw assembly. Accordingly, like numerals are used to designate the same parts. In order to further minimize the tendency of the clamping jaws 102" and 103" to bind on the intermediate jaw member during relative movement therebetween, anti-friction elements are provided at the interface between the clamp jaws and the jaw members. In the form shown, one set of the anti-friction elements 201 are disposed in recesses 202 formed at the interface between the intermediate jaw member and the clamp jaw 103". The recesses 202 are located at spaced points along the intermediate jaw member, for example, adjacent the ends of the intermediate jaw member and the rollers 201 are disposed in rolling engagement with the intermediate jaw member and clamp jaw 103". A second set of anti-friction rollers 203 are disposed in recesses 204 at the interface between the intermediate jaw member 101" and other clamp jaw 102" in rolling engagement therewith to minimize binding. The clamping jaw retainer 114c that overlies the outer face of the clamp jaw 103" is conveniently in the form of a bar that spans several of the clamp jaw fasteners 113" and a further set of anti-friction rollers 205 are disposed in recesses 206a, 206b at the interface between the clamp jaw 103" and the bar 114c while a single set of rollers is herein shown provided at the interfaces between the clamp jaw 102" and intermediate jaw member 101", between the clamp jaw 103" and the intermediate jaw member 101"; and between the clamp jaw 103" and the retainer bar 114c, it is to be understood that additional sets of rollers could be provided at one or more of these interfaces. In the wrapping machine disclosed, the clamp jaw 103" is at the trail side of the assembly during the heat sealing operation and draws the film with the jaw assembly. A relatively higher clamping pressure is provided for the trail side clamp jaw 103" and it has been found advantageous to locate the roller 201 somewhat above the rollers 205 to accommodate the force couple on the trail clamping jaw during the sealing operation. The rollers 203 and 205 are preferably at a level adjacent the clamp jaw fasteners 113".

Thus, in each of the different embodiment, the jaw assemblies are arranged so that the upper clamp jaws are movable relative to the intermediate jaw and relative to each other, and the springs for biasing the clamp jaws are located intermediate the upper clamp jaws. This minimizes the distance between the sealing jaw and the outer face of the clamp jaw so that the sealing jaw can seal and sever at a point closely adjacent the side of the article being wrapped, as shown in FIGS. 16–19. Moreover, the clamp jaws sequentially clamp the film, first at the forward side of the jaw assembly adjacent the article, as shown in FIG. 17, and then at the rear side of the jaws as shown in FIG. 18 to draw a loop of material over the lower sealing jaw. The upper sealing jaw thereafter engages the webs and depresses the lower sealing jaw, as shown in FIG. 19, to form a slack loop during sealing.

The upper and lower jaw means 71 and 76, as they move along the lower run 72b clamp the overlapping portions of the webs at the trailing side of the article therebetween and heat-seal and sever the webs as the jaw means pushes the articles along the article support. The webs W and W' are drawn along the jaw means as they advance along the run 72b, and provision is made for retracting the webs after the jaw means have released the same, and before completing wrapping of a succeeding article so that the webs can move into engagement with the lead side of the succeeding article. Since a succeeding article may be at least partially advanced onto the article support means before the web is severed at the trail side of the succeeding article, and as the succeeding article resting on the lower web W' would impede retraction of the same, it is necessary to retract at least the upper web W. A preferred web feed control and retracting apparatus is illustrated herein.

As previously described, the web W is supplied from a roll R rotatably supported by a shaft 51 and roller-type bearing 52. A break mechanism designated B is provided for controlling unwinding of the web from the roll R to allow withdrawal of the web as the article is advanced through the web and along the article support, and a web retracting apparatus designated T is arranged to form a variable loop in the web intermediate the roll and the curtain to retract the web when the jaw means releases the latter.

The web tensioning and retracting apparatus T is advantageously of the pneumatic type which applies a pressure differential to a section of the web intermediate the roll R and the curtain to produce a slack loop therein and retract the web when the web is released from the clamping jaws.

The web feeding and tensioning apparatus is so arranged that the web can be freely withdrawn from the roll R during forward movement of the articles and that the brake mechanism B will automatically brake the web roll R when the web tension is decreased incident to releasing of the web by the clamping jaws, and that the web tensioning and retracting apparatus T will then retract the portion of the web intermediate the roll and the curtain to draw the curtain rearwardly relative to the article path into engagement with the lead side of the next succeeding article.

A similar brake mechanism designated B' is herein shown provided for the roll R' that supplies the lower web W'. A modified form of web tensioning apparatus designated T' is herein shown and comprises a roller 211 which engages a loop of the web W' intermediate the rollers 56 and 57. The roller 211 is conveniently pivotally mounted on an arm 212 and is gravitationally urged downwardly to form a loop in the web W'. Auxiliary roll supports designated 213 and 214 may be provided for supporting extra rolls of the web material, if desired, to reduce the down time when one of the supply rolls is exhausted.

A control circuit for the wrapping apparatus is diagrammatically illustrated in FIG. 20. As illustrated therein, the drive motor 81 and the motor 205a for the vacuum pump 205 are connected through conductors 221 and 222 and relay contacts 223a and 223b to power supply conductors 224 and 225 leading to a power source (not shown). The power supply conductors 224 and 225 are also connected as through conductors 226 and 227, relay contacts 228a and 228b and variable transformer 229, to a transformer 231, the secondary of which is connected to the afore-described conductors 173 leading to the electrically conductive shoes 172. As the jaw means 71 moves along the lower run 72b, the brushes 135 come into wiping contact with the shoes 172 and establish a circuit to the resistance wire 124 carried by the jaws. The primary of a transformer 235 is connected through conductors 236 and 237 to the power supply conductors 224 and 225, and the secondary of this transformer is connected to a control circuit including conductors 238 and 239. The control circuit includes a motor start circuit connected to conductors 238 and 239 and comprising serially connected, normally open, manually operable start switch 241, conductor 242, normally closed, manually operable stop switch 243, conductor 244, normally closed switch 94 and relay actuator 223. Relay actuator 223 is operative when energized to close the normally open relay contacts 223a and 223b to the motors 81 and 205a to start the same. A holding circuit is provided and includes serially connected, normally closed "jog" switch 245, conductor 246, normally open relay contacts 223c and conductor 247 connected across the start switch 241 to establish a holding circuit for the relay 223 when the latter is energized. A heater control circuit including a normally open switch 251, conductor 252, normally closed switch 253, conductor 254, normally open relay contacts 223d, conductor 255 and relay actuator 228 are connected in a series circuit with each other and to the supply conductors 238 and 239. A holding circuit for the relay 228 is provided and includes conductor 258, normally open relay contacts 228c and conductor 259 connected in series with each other and in parallel to the switch 251. As previously described, the normally closed switch 94 is operated to its open position in response to a movement of the transmission anchor lever 92 in the event of an overload in the machine and, when opened, will deenergize relay actuator 228 to stop the machine. The "jog" switch 245 is normally closed and is opened only when it is desired to effect intermittent manual operation of the apparatus under the control of the start switch 241. The switches 251 and 253 are mounted as shown in FIGS. 1–5 alongside the path of movement of the upper jaw means 71 and have actuators 251a and 253a positioned to be engaged by a part of the upper jaw means such as the rollers 141. Normally open switch 251 is arranged so as to be actuated before the switch 253, and the switches 251 and 253 are mounted for adjustment longitudinally of the path of movement of the jaws to control the timing and duration of energization of the heat-sealing wire 124.

Starting of the machine is effected by closing the normally open start switch to establish a circuit through the normally closed stop switch 243, normally closed switch 94 and relay actuator 223 to energize the latter. When actuator 223 is energized, it closes contacts 223a and 223b to energize the drive motor 81 and vacuum pump motor 205a. In addition, it closes contacts 223c and 223d. The closing of contacts 223c establishes a holding circuit in parallel with the start switch 241 so that reopening of the start switch does not deenergize the relay 223. When the normally open switch 251 is thereafter closed by the passage of the jaw means 71 thereby, circuit is established through the normally closed switch 253 and relay contacts 223d to the relay actuator 228. Energization of the latter closes the relay contacts 223a and 223b to establish a circuit to the heat-sealing wire 124. Closing of relay actuator 228 also closes the normally open contacts 228c in parallel with the switch 251 to thereby provide a holding circuit for the relay 228 to maintain the latter energized. When the jaw means thereafter moves past the switch 253, it opens the circuit to the relay actuator 228 and opens the circuit to deenergize the heat-sealing wire 124.

When the wrapping apparatus is operated to wrap groups of cylindrical articles, it has been found advantageous to use lateral guides designated 261 in FIG. 4. The guides are adjustably supported by brackets 262 on the support plates 31 and 32 and are spaced above the article support means 26 a distance sufficient to clear the path of travel of the upper jaw means 71 as the latter moves along the lower run 72b thereof. The lateral carton guide means 261 are preferably shaped as shown in phantom in FIG. 3 to also extend upwardly alongside the path of travel of the upper jaw means 71 as they move along the run 72c so that the wrapper W when released by the jaw means, will be guided between the guides 261. In this manner, the guides 261 also function to laterally locate the curtain or webs W and W'.

The webs W and W' having previously been joined together as by manually drawing a section of both webs between the upper and lower jaw means as they are advanced, forms a curtain which extends crosswise of the article path as shown in FIG. 3. Articles designated A are successively advanced by the conveyor means 25 into the web. As the first article is advanced to the outlet end of the conveyor 25 and onto the article support means 26, the lead side of the article engages the curtain of material and draws the webs W, W' therewith along the top and bottom of the article and, when the article pushers 46 pass around the end of the inlet conveyor as shown in FIG. 5, advance of the articles is interrupted. The article support means 26 provides a dwell support for the articles, that is, it supports the articles in a substantially stationary position until the jaw means 71 moves downwardly and inwardly along the run 72a to press the curtain against the trail side of the article on the support means and to thereafter advance the article along the support means as the jaw means moves along the run 72b. After the upper jaw means 71 has engaged the trail side of the article and has started movement of the article along the path, the lower jaw means moves into opposed relation to the upper jaw means and clamps the overlapping portions of the web to the upper jaw means as shown in FIG. 6. The overlapping portions of the webs are severed by the wire 124 and heat-sealed at opposite sides of the severance while the articles are being advanced by the jaw means. The webs W and W' are pulled along the jaw means during forward movement thereof. Severance of the webs at the trail side of the article separates the wrapped article from the remainder of the webs and rejoins the webs to re-form or reconstitute the curtain of material. As the jaw means approaches the end of the run 72b, clamping pressure on the jaw means is released to release the rejoined webs. The retracting means T then operates to retract the upper web until the curtain either engages the lead side of the next succeeding article or if there is no succeeding article being advanced onto the article support means by the inlet conveyor 25, then both the upper and lower retracting means T and T' operate together to retract the curtain back to the position shown in FIG. 3 at the outlet end of the conveyor 25. The jaw means are spaced apart along the chain 72 a distance greater than the distance measured along the lower run 72b in which the jaw means are maintained in clamping engagement with the web. Thus, as diagrammatically illustrated in FIGS. 5 and 6, the web is released from the jaw means 71' at the trail side of one article A' before a succeeding jaw means 71" moves into clamping engagement with the web at the trail side of the succeeding article A". As soon as the jaw 71' releases the webs, the web retracting means operates to retract the web. The web is spaced from the lead side of the succeeding article A" at the instant that the jaw 71' releases the web and the air in the space between the web and the article causes the web to billow somewhat as shown in phantom at C' in FIG. 5 during retraction of the webs and until the air can escape at the sides of the article. Retraction of the web allows the curtain to closely engage the lead side of the article as shown in solid lines at C in FIG. 5 and, since the succeeding jaw means moves downwardly into abutting engagement with the trailing side of that article before the webs are clamped to the jaw means, the seal is effected at a point closely adjacent the trail side of the article to thereby produce a relatively close wrap. Stated otherwise, the webs are drawn tightly around the trail side of the article during sealing and the line of seal of the webs is spaced from the rear side of the article a minimum distance corresponding to the spacing between the sealing wire 124 and the front clamping jaw 102. In the absence of a succeeding article being advanced onto the loading platform by the inlet conveyor means, the web will be retracted to the outlet of the inlet conveyor as shown in FIG. 3. In this position, the jaw means 71 and 76 do not engage the web so that they can operate continuously along their respective courses without withdrawing further wrapping material, and until a succeeding article is advanced by the inlet conveyor means.

As will be seen, the articles withdraw material as they are advanced into the curtain by the inlet conveyor means 25, and the amount of material withdrawn is determined by the size of the articles. Advance of the articles by the inlet conveyor means is interrupted when the trail side of the articles reaches the end of the inlet conveyor so that the trail side of the articles is always located at a preselected location independent of the size of the articles. Consequently, apparatus assures a relatively close wrap on the articles independent of size, and without requiring any change in the spacing of the jaws or the timing of the apparatus. In fact, articles of widely different size and shape can be intermixed and alternately wrapped on the wrapping apparatus. Moreover, the articles can be grouped and wrapped in groups if desired. In order to laterally contain grouped cylindrical articles and to maintain the web centered, the laterally spaced guides 261 are advantageously provided and mounted to extend alongside the path of movement of the groups of articles on the article support means 26.

What is claimed as new is:

1. In an apparatus for packing in a heat sealable packaging material including means for clamping and sealing overlapping portions of said material together, the improvement wherein said clamping and sealing means includes a jaw assembly having an elongated intermediate jaw member and first and second clamping jaws, said intermediate jaw member having a sealing jaw face along one edge thereof and first and second relatively parallel side faces disposed in planes transverse to said sealing jaw face, said intermediate jaw member having a first set of spring receiving cavities therein opening at spaced points along said first side face of the intermediate jaw member and a second set of spring receiving cavities therein opening at spaced points along said second side face of the intermediate jaw member, said first and second clamping jaws respectively extending alongside said first and second side faces of said intermediate jaw member and overlying the openings of said first and second sets of cavities, said first and second clamping jaws having first and second spring engaging shoulders respectively registering with the openings of said first and second sets of cavities, a first set of springs extending into said first set of cavities and operatively engaging said first spring engaging shoulders on said first clamping jaw to yieldably urge the latter in a direction outwardly of the sealing jaw face to a first position, a second set of springs extending into said second set of cavities and operatively engaging said second spring engaging shoulders on said second clamping jaw to yieldably urge the latter in a direction outwardly of the sealing jaw face to a second position, clamping jaw connecting means extending through said intermediate jaw member and mounting said first and second clamping jaws for limited sliding movement relative to a respective side face of said jaw member and relative to each other in a direction perpendicular to said sealing jaw face, and an elongated heater element on said sealing jaw face.

2. An apparatus according to claim 1 wherein the first and second clamping jaws in said first and second positions have the jaw faces thereon offset relatively different distances from said sealing jaw face.

3. An apparatus according to claim 1 wherein said intermediate jaw member has openings extending therethrough and said clamping jaw connecting means includes fasteners attached to said first clamping jaw and loosely extending through said openings in said intermediate jaw member to permit said limited movement of the first clamping jaw relative to the intermediate jaw members, said second clamping jaw having openings loosely receiving said fasteners and said fasteners including clamp jaw retaining means overlying the outer face of said second clamping jaws to permit said limited movement of the second clamping jaw relative to the intermediate jaw member and relative to the first clamping jaw.

4. An apparatus according to claim 1 in which said first and second sets of springs are disposed entirely within said intermediate jaw member and said first and second spring engaging shoulders respectively extend into the first and second sets of cavities and into engagement with the respective first and second sets of springs.

5. An apparatus according to claim 1 wherein said first and second clamping jaws have spring receiving cavities respectively registering with the first and second sets of cavities in the intermediate jaw member, said first and second sets of springs comprising coil type compression springs extending into the spring receiving cavities in the clamping jaws with their lengthwise axis paralleling the direction of movement of the clamping jaws relative to the sealing jaw member.

6. An apparatus according to claim 5 wherein the jaw face on the first clamping jaw projects a relatively greater distance from the sealing jaw face than the jaw face on the second clamping jaw when the clamping jaws are in their respective first and second positions.

7. An apparatus according to claim 6 wherein length of the cavities in said first clamp jaw, measured in said direction of movement of the clamping jaws, is greater than the length of the cavities in the second clamp jaw, and like springs are used for both the first and second sets of springs.

8. An apparatus according to claim 1 including anti-friction rollers disposed at the interface between each of the clamping jaws and the intermediate jaw member.

9. An apparatus according to claim 1 including groove means at the interface between at least one of the clamping jaws and the intermediate jaw member, and anti-friction elements disposed in the groove means in rolling engagement with that clamping jaw and the intermediate jaw member.

10. An apparatus according to claim 1 including a first groove means at the interface between the first clamp jaw and the intermediate jaw member and a first set of anti-friction elements in said first groove means; a second groove means at the interface between the second clamp jaw and the intermediate jaw member and a second set of anti-friction elements in said second groove means, said second clamp jaw haviing a clamp jaw retainer at the outer side thereof attached to said clamp jaw connecting means, and a third groove means at the interface between said second clamp jaw and the clamp jaw retainer and a third set of anti-friction rollers in said third groove means.

11. In an apparatus for packaging in a heat sealable packaging material including first and second jaw means and means for relatively moving said first and second jaw means into and out of opposed material gripping position for clamping overlapping portions of said material therebetween to seal the same, the improvement wherein:
 (a) said second jaw means includes:
  (1) a sealing jaw having a sealing jaw face, and
  (2) spaced clamping jaws at relatively opposite sides of the sealing jaw having clamping jaw faces offset substantially the same distance from said sealing jaw face,
 (b) said first jaw means includes:
  (1) a sealing jaw having a sealing jaw face, and
  (2) spaced clamping jaws at relatively opposite sides of the sealing jaw having clamping jaw faces,
  (3) means interconnecting said clamping and sealing jaws and supporting the clamping jaws for movement relative to the sealing jaw and relative to each other, in a direction laterally of the sealing jaw face,
  (4) means on the first jaw means yieldably urging its clamping jaws relative to its sealing jaw to normal clamp jaw positions in which the clamping jaw faces are disposed relatively different distances from the sealing jaw face,
 (c) whereby upon relative movement of said first and second jaw means into opposed material gripping position, one clamp jaw on the first jaw means is adapted to clamp the material to a corresponding one of the clamp jaws on the second jaw means before the other clamp jaw or the first jaw means clamps the material to a corresponding other one of the clamp jaws on the second jaw means.

12. In an apparatus for packing in a heat sealable packaging material including first and second jaw means and means for relatively moving said first and second jaw means into and out of opposed gripping position for clamping overlapping portions of said material therebetween to seal the same, the improvement wherein:
 (a) said second jaw means includes
  (1) a sealing jaw having a sealing jaw face,
  (2) spaced clamping jaws at opposite sides of said sealing jaw face and having clamping jaw faces, and
  (3) means yieldably mounting said sealing jaw for movement relative to said clamping jaws in a direction laterally of the sealing jaw face, said sealing jaw face being normally offset outwardly of a plane through said clamping jaw faces and said sealing jaw being yieldably depressably in response to pressure applied thereto to a position in which the sealing jaw face is relatively closer to the plane through said clamping jaw faces,
 (b) said first jaw means includes:
  (1) a sealing jaw having a sealing jaw face,
  (2) spaced clamping jaws at relatively opposite sides of the sealing jaw face and having clamping jaw faces,
  (3) means interconnecting said clamping and sealing jaws and supporting the clamping jaws for movement relative to the sealing jaw and relative to each other in a direction laterally of the sealing jaw face,
  (4) means on the first jaw means yieldably urging its clamping jaws relative to the sealing jaw to normal clamp jaw positions in which the clamping jaw faces are offset outwardly relatively different distances from the sealing jaw face, said clamping jaws being yieldably movable in response to pressure applied thereto to positions relatively closer to the sealing jaw face,
 (c) said means for relatively moving mid jaw means including means engaging the clamping jaws on the second jaw means and the sealing jaw on the first jaw means whereby upon relative movement of said first and second jaw means into opposed material gripping position, one clamp jaw on the first jaw means is adapted to clamp the material to a corresponding one of the clamp jaws on the second jaw means before the other clamp jaw on the first jaw means clamps the material to the corresponding other one of the clamp jaws on the second jaw means to draw the material over the sealing jaw on the second jaw means, and the sealing jaw on the first jaw means thereafter presses against the material overlying the sealing jaw of the second jaw means to depress the last mentioned sealing jaw.

13. Apparatus according to claim 12 wherein said sealing jaw on said first jaw means has a heat sealing and cutting element extending lengthwise of its sealing jaw face.

14. Apparatus according to claim 12 wherein said clamping jaws in said second jaw means have resilient clamping jaw faces.

15. Apparatus according to claim 12 wherein said first jaw means has openings extending through its sealing jaw between opposed side faces thereof and clamping jaw connecting means extending through said openings and mounting the clamping jaws of the first jaw means for limited sliding movement relative to the respective side face of the sealing jaw.

16. Apparatus according to claim 12 wherein said means on the first jaw means yieldably urging its clamping jaws relative to the sealing jaws includes spring receiving cavities at spaced locations along the sealing jaw on the first jaw means, a first set of spring means extending into certain of said cavities and operatively connected to one clamping jaw of the first jaw means and a second set of spring means extending into others of said cavities and operatively to the other clamping jaw of the first jaw means.

17. In an apparatus for wrapping articles in a heat sealable wrapping material including at least one jaw means and means for moving said jaw means into and out of engagement with portions of said wrapping material, the improvement wherein said jaw means includes a rigid intermediate jaw member and first and second clamping jaws movable relative to said intermediate jaw member and relative to each other, said intermediate jaw member having a sealing jaw face along one edge thereof and first and second relatively parallel side faces extending transverse to said sealing jaw face, said intermediate jaw member having first and second sets of openings in said first and second side faces at spaced locations along the jaw member, said first clamping jaw extending alongside said first side face and having first projection means extending into the openings of the first set, said second clamping jaw extending alongside the second side face and having second projection means extending into the openings of said second set, spring means interposed between said jaw member and said first and second projections for yieldably urging said first and second clamping jaws in one direction relative to said jaw member, means for retaining said first and second clamping jaws in assembled relation on said jaw member, and an elongated heating element on said sealing jaw face.

18. An apparatus according to claim 17 wherein the end faces of said first and second clamping jaws normally project relatively different distances from said jaw members.

19. In an apparatus for packaging in a heat sealable packaging material including means for clamping and sealing overlapping portions of said material together, the improvement wherein said clamping means includes a jaw assembly having an elongated intermediate jaw member and first and second clamping jaws at oposite sides of said intermediate jaw member, means on said intermediate jaw member defining a sealing jaw face between said clamping jaws, said intermediate jaw member having first and second relatively parallel side faces disposed in planes transverse to said sealing jaw face, means mounting said first and second clamping jaws on said intermediate jaw member for limited sliding movement relative to said first and second side faces respectively and relative to each other in a direction transverse to said sealing jaw face, said intermediate jaw member having first and second sets of cavities respectively, opening at said first and second side faces, said first and second clamping jaws having spring receiving cavities respectively registering with the first and second sets of cavities in the intermediate jaw member for forming first and second sets of spring chambers, first and second sets of coil type compression springs disposed in the first and second sets of spring chambers with their lengthwise axis disposed normal to said clamping jaw face, the cavities in the intermediate jaw member and in the clamping jaws having wall portions engageable with ends of the respective springs to normally position the first and second clamping jaw in preselected relation to the intermediate jaws.

References Cited
UNITED STATES PATENTS

| 3,061,989 | 11/1962 | Newell et al. | 53—182 |
| 3,278,158 | 10/1966 | Saldana | 254—106 |
| 3,321,353 | 5/1967 | Zelnick | 156—515X |
| 3,334,004 | 8/1967 | Faust et al. | 156—515X |

FOREIGN PATENTS

| 603,933 | 8/1960 | Canada | 156—380 |
| 974,827 | 11/1964 | Great Britain | 156—515 |

BENJAMIN A. BORCHELT, Primary Examiner

J. M. HANLEY, Assistant Examiner

U.S. Cl. X.R.

156—251, 380